(12) United States Patent
Endoh et al.

(10) Patent No.: US 8,810,910 B2
(45) Date of Patent: Aug. 19, 2014

(54) ANTIREFLECTION OPTICAL DEVICE AND METHOD OF MANUFACTURING MASTER

(75) Inventors: Sohmei Endoh, Miyagi (JP); Kazuya Hayashibe, Saitama (JP)

(73) Assignee: Sony Corporation, Tokyo (JP)

( * ) Notice: Subject to any disclaimer, the term of this patent is extended or adjusted under 35 U.S.C. 154(b) by 720 days.

(21) Appl. No.: 12/597,812

(22) PCT Filed: Feb. 27, 2009

(86) PCT No.: PCT/JP2009/054227
§ 371 (c)(1),
(2), (4) Date: Oct. 27, 2009

(87) PCT Pub. No.: WO2009/107871
PCT Pub. Date: Sep. 3, 2009

(65) Prior Publication Data
US 2010/0118404 A1 May 13, 2010

(30) Foreign Application Priority Data
Feb. 27, 2008 (JP) .................. 2008-046941

(51) Int. Cl.
*G02B 1/10* (2006.01)
*G02B 1/11* (2006.01)

(52) U.S. Cl.
CPC ...................... *G02B 1/118* (2013.01)
USPC .......................................................... 359/581

(58) Field of Classification Search
CPC ...... G02B 1/115; G02B 5/285; G02B 5/0278; G02B 5/0242
USPC ................................. 359/581, 599
See application file for complete search history.

(56) References Cited

U.S. PATENT DOCUMENTS

| 7,145,721 | B2 * | 12/2006 | Banish et al. .................. 359/569 |
| 7,297,386 | B2 * | 11/2007 | Suzuki et al. .................. 428/141 |
| 2003/0011315 | A1 | 1/2003 | Ito et al. |
| 2003/0123244 | A1 * | 7/2003 | Ishitaka .......................... 362/31 |
| 2008/0265149 | A1 * | 10/2008 | Endoh et al. ............... 250/237 R |
| 2009/0128908 | A1 | 5/2009 | Nakazawa et al. |
| 2010/0091371 | A1 * | 4/2010 | Chatani et al. ................ 359/576 |

FOREIGN PATENT DOCUMENTS

JP          03-036024          2/1991

(Continued)

OTHER PUBLICATIONS

Japanese Office Action issued on Oct. 13, 2009, for corresponding Japanese Patent Application JP 2009-175928.

(Continued)

*Primary Examiner* — Thomas K Pham
(74) *Attorney, Agent, or Firm* — K & L Gates LLP

(57) ABSTRACT

An optical device is provided including plural structures formed of a convex portion or a concave portion are arranged on the surface of a base member with a fine pitch equal to or less than the wavelength of visible light. The structures are arranged on the surface of the base member to form plural lines of tracks and form a hexagonal lattice pattern or a quasi-hexagonal lattice pattern. Each structure has an elliptical cone shape or a truncated elliptical cone shape of which the long-axis direction is parallel to the track extending direction.

6 Claims, 41 Drawing Sheets

(56) References Cited

FOREIGN PATENT DOCUMENTS

| | | |
|---|---|---|
| JP | 2001-264520 | 9/2001 |
| JP | 2003-004916 | 1/2003 |
| JP | 2003-131390 | 5/2003 |
| JP | 2003-240904 | 8/2003 |
| JP | 2005-173457 | 6/2005 |
| JP | 2006-330085 | 12/2006 |
| JP | 2007-076242 | 3/2007 |
| JP | 2007-256340 | 10/2007 |
| JP | 2008-304637 | 12/2008 |
| WO | 2007/055245 | 5/2007 |
| WO | 2008/023816 | 2/2008 |

OTHER PUBLICATIONS

Japanese Office Action issued on Oct. 13, 2009, for corresponding Japanese Patent Application JP 2009-175929.
International Search Report dated Apr. 7, 2009, for corresponding Patent Application PCT/JP2009/054227.
Japanese Office Action issued Feb. 12, 2013 in corresponding Japanese Patent Application No. 2009-283510.
Japanese Office Action issued Feb. 12, 2013 in corresponding Japanese Patent Application No. 2010-096301.
Japanese Office Action issued Jul. 30, 2013 in corresponding Japanese Patent Application No. 2009-283510.
European Search Report dated May 14, 2014 in corresponding European Patent Application No. 09714540.3.

* cited by examiner

United States Patent US 8,810,910 B2

ANTIREFLECTION OPTICAL DEVICE AND METHOD OF MANUFACTURING MASTER

CROSS REFERENCE TO RELATED APPLICATIONS

The present application is a National Stage of International Application No. PCT/JP2009/054227 filed on Feb. 27, 2009 and which claims priority to Japanese Patent Application No. 2008-046941 filed on Feb. 27, 2008 and which is related to Japanese Patent Application No. 2009-047301 filed on Feb. 27, 2009, the entire contents of which are being incorporated herein by reference.

BACKGROUND

In the past, an optical device using a light-transmitting substrate such as glass or plastic which is subjected to surface treatment for suppressing the surface reflection of light was known. As such a type of surface treatment, a technique of forming fine and dense concave-convex portions (moth eyes) on the surface of an optical device (for example, see "OPTICAL TECHNOLOGY CONTACT", Vol. 43, No. 11 (2005), 630-637).

In general, when periodic concave-convex shapes are formed on the surface of an optical device, light is diffracted at the time of passing through the concave-convex shapes and the straight-traveling component of the transmitted light is greatly reduced. However, when the pitch of the concave-convex shapes is smaller than the wavelength of light passing therethrough, the light is not diffracted. For example, when the concave-convex shapes are formed in the following rectangular form, an effective antireflection effect is obtained for the light with a single wavelength corresponding to the pitch or the depth thereof.

A moth-eye structure (with a pitch of about 300 nm and a depth of about 400 nm) having a micro tent shape is disclosed as a moth-eye structure manufactured using the electron beam exposure (for example, see "MOLD MASTER FOR ANTIREFLECTION STRUCTURE (MOTH EYE) WITHOUT WAVELENGTH DEPENDENCE" of NTT ADVANCED TECHNOLOGY CORPORATION, [online], [searched on February 27, Hei 20], Internet<http://keytech.ntt-at.co.jp/nano/prd__0033.html>). It is possible to obtain a high-performance antireflection characteristic with a reflectance of 1% or less using this moth-eye structure.

However, recently, to improve the visibility of various display apparatuses such as liquid crystal displays, there is a need for realizing a better antireflection characteristic.

SUMMARY

The present disclosure relates to an antireflection optical device and a method of manufacturing a master used to manufacture the antireflection optical device. More specifically, the present disclosure relates to an antireflection optical device in which plural structures formed of a convex portion or a concave portion are arranged on the surface thereof with a fine pitch equal to or less than the wavelength of visible light.

An object of the present embodiments is to provide an antireflection optical device with an excellent antireflection characteristic and a method of manufacturing a master used to manufacture the antireflection optical device.

According to a first embodiment, there is provided an antireflection optical device including: a base member; and a plurality of convex or concave structures arranged on the surface of the base member with a fine pitch equal to or smaller than the wavelength of visible light, wherein the structures are arranged on the surface of the base member to form a plurality of lines of tracks and form one of a hexagonal lattice pattern, a quasi-hexagonal lattice pattern, a tetragonal lattice pattern, and a quasi-tetragonal lattice pattern, and wherein each structure has an elliptical cone shape or a truncated elliptical cone shape of which the long-axis direction is parallel to the track extending direction.

According to a second embodiment, there is provided an antireflection optical device including: a base member; and a plurality of structures formed of a convex portion or a concave portion and arranged on the surface of the base member with a fine pitch equal to or smaller than the wavelength of visible light, wherein the structures are arranged on the surface of the base member to form a plurality of lines of tracks and form one of a quasi-hexagonal lattice pattern, a tetragonal lattice pattern, and a quasi-tetragonal lattice pattern, and wherein a filling rate of the structures to the surface of the base member is 65% or more.

According to a third embodiment, there is provided an antireflection optical device including: a base member; a plurality of structures formed of a convex portion or a concave portion and arranged on the surface of the base member with a fine pitch equal to or smaller than the wavelength of visible light, wherein the structures are arranged on the surface of the base member to form a plurality of lines of tracks and form a quasi-hexagonal lattice pattern, and wherein a ratio $((2r/P1) \times 100)$ of a diameter $2r$ to an arrangement pitch $P1$ is 85% or more where $P1$ represents the arrangement pitch of the structures in the same track and $2r$ represents the diameter of the bottom surface of each structure in the track extending direction.

According to a fourth embodiment, there is provided an antireflection optical device including: a base member; and a plurality of structures formed of a convex portion or a concave portion and arranged on the surface of the base member with a fine pitch equal to or smaller than the wavelength of visible light, wherein the structures are arranged on the surface of the base member to form a plurality of lines of tracks and form one of a tetragonal lattice pattern and a quasi-tetragonal lattice pattern, and wherein a ratio $((2r/P1) \times 100)$ of a diameter $2r$ to an arrangement pitch $P1$ is 90% or more where $P1$ represents the arrangement pitch of the structures in the same track and $2r$ represents the diameter of the bottom surface of each structure in the track extending direction.

According to a fifth embodiment, there is provided a method of manufacturing a master used to manufacture an antireflection optical device, including the steps of: forming a resist layer on a circumferential surface of a columnar or cylindrical master; forming latent images with a pitch smaller than the wavelength of visible light by intermittently applying a laser beam to the resist layer while rotating the master having the resist layer formed thereon and relatively moving the spot of the laser beam in parallel to the center axis of the columnar or cylindrical master; forming a resist pattern on the surface of the master by developing the resist layer; and forming concave or convex structures on the surface of the master by performing an etching process using the resist pattern as a mask, wherein in the forming of the latent images, the latent images are arranged on the surface of the base member to form a plurality of lines of tracks and form one of a hexagonal lattice pattern, a quasi-hexagonal lattice pattern, a tetragonal lattice pattern, and a quasi-tetragonal lattice pattern, and wherein each latent image has an elliptical shape of which the long-axis direction is parallel to the track extending direction.

According to a sixth embodiment, there is provided a method of manufacturing a master used to manufacture an antireflection optical device, including the steps of: forming a resist layer on a circumferential surface of a columnar or cylindrical master; forming latent images with a pitch smaller than the wavelength of visible light by intermittently applying a laser beam to the resist layer while rotating the master having the resist layer formed thereon and relatively moving the spot of the laser beam in parallel to the center axis of the columnar or cylindrical master; forming a resist pattern on the surface of the master by developing the resist layer; and forming concave or convex structures on the surface of the master by performing an etching process using the resist pattern as a mask, wherein in the forming of the latent images, the latent images are arranged on the surface of the base member to form a plurality of lines of tracks and form one of a quasi-hexagonal lattice pattern, a tetragonal lattice pattern, and a quasi-tetragonal lattice pattern, and wherein a filling rate of the structures to the surface of the master is 65% or more.

According to a seventh embodiment, there is provided a method of manufacturing a master used to manufacture an antireflection optical device, including the steps of: forming a resist layer on a circumferential surface of a columnar or cylindrical master; forming latent images with a pitch smaller than the wavelength of visible light by intermittently applying a laser beam to the resist layer while rotating the master having the resist layer formed thereon and relatively moving the spot of the laser beam in parallel to the center axis of the columnar or cylindrical master; forming a resist pattern on the surface of the master by developing the resist layer; and forming concave or convex structures on the surface of the master by performing an etching process using the resist pattern as a mask, wherein in the forming of the latent images, the latent images are arranged on the surface of the master to form a plurality of lines of tracks and form a quasi-hexagonal lattice pattern, and wherein a ratio (($2r/P1$)×100) of a diameter $2r$ to an arrangement pitch $P1$ is 85% or more where $P1$ represents the arrangement pitch of the structures in the same track and $2r$ represents the diameter of each structure in the track extending direction.

According to an eighth embodiment, there is provided a method of manufacturing a master used to manufacture an antireflection optical device, including the steps of: forming a resist layer on a circumferential surface of a columnar or cylindrical master; forming latent images with a pitch smaller than the wavelength of visible light by intermittently applying a laser beam to the resist layer while rotating the master having the resist layer formed thereon and relatively moving the spot of the laser beam in parallel to the center axis of the columnar or cylindrical master; forming a resist pattern on the surface of the master by developing the resist layer; and forming concave or convex structures on the surface of the master by performing an etching process using the resist pattern as a mask, wherein in the forming of the latent images, the latent images are arranged on the surface of the master to form a plurality of lines of tracks and form one of a tetragonal lattice pattern and a quasi-tetragonal lattice pattern, and wherein a ratio (($2r/P1$)×100) of a diameter $2r$ to an arrangement pitch $P1$ is 127% or more where $P1$ represents the arrangement pitch of the structures in the same track and $2r$ represents the diameter of each structure in the track extending direction.

In the above-mentioned configurations, it is preferable that the main structures are periodically arranged in a tetragonal lattice shape or a quasi-tetragonal lattice shape. Here, the tetragonal lattice means a regular tetragonal lattice. The quasi-tetragonal lattice means a distorted regular tetragonal lattice, dissimilarly to the regular tetragonal lattice.

For example, when the structures are arranged in a straight line, the quasi-tetragonal lattice means a tetragonal lattice distorted by stretching the regular tetragonal lattice in the straight line direction (track direction). When the structures are arranged in a meandering shape, the quasi-tetragonal lattice means a tetragonal lattice obtained by distorting the regular tetragonal lattice along the meandering arrangement. Alternatively, the quasi-tetragonal lattice means a tetragonal lattice distorted by stretching the regular tetragonal lattice in the straight line direction (track direction) and obtained by distorting the regular tetragonal lattice along the meandering arrangement.

In the above-mentioned configurations, it is preferable that the structures are periodically arranged in a hexagonal lattice shape or a quasi-hexagonal lattice shape. Here, the hexagonal lattice means a regular hexagonal lattice. The quasi-hexagonal lattice means a distorted regular hexagonal lattice, unlike the regular hexagonal lattice.

For example, when the structures are arranged in a straight line, the quasi-hexagonal lattice means a hexagonal lattice distorted by stretching the regular hexagonal lattice in the straight line direction (track direction). When the structures are arranged in a meandering shape, the quasi-hexagonal lattice means a hexagonal lattice obtained by distorting the regular hexagonal lattice along the meandering arrangement. Alternatively, the quasi-hexagonal lattice means a hexagonal lattice distorted by stretching the regular hexagonal lattice in the straight line direction (track direction) and obtained by distorting the regular hexagonal lattice along the meandering arrangement.

In the above-mentioned configurations, the ellipse includes a slightly distorted ellipse, as well as a perfect ellipse defined mathematically. The circle includes a slightly distorted circle, as well as a perfect circle (perfect roundness) defined mathematically.

In the above-mentioned configurations, it is preferable that an arrangement pitch $P1$ of the structures in the same track is greater than an arrangement pitch $P2$ of the structures in two adjacent tracks. According to this configuration, since the filling rate of the structures having an elliptical cone shape or a truncated elliptical cone shape can be improved, it is possible to improve the antireflection characteristic.

In the above-mentioned configurations, when the structures form one of a hexagonal lattice pattern and a quasi-hexagonal lattice pattern on the surface of the base member, it is preferable that a ratio $P1/P2$ satisfies one relation of $1.00 \leq P1/P2 \leq 1.1$ and $1.00 < P1/P2 \leq 1.1$, where $P1$ represents an arrangement pitch of the structures in the same track and $P2$ represents an arrangement pitch of the structures in two adjacent tracks. By setting this numerical range, since the filling rate of the structures having an elliptical cone shape or a truncated elliptical cone shape can be improved, it is possible to improve the antireflection characteristic.

In the above-mentioned configurations, when the structures form one of a hexagonal lattice pattern and a quasi-hexagonal lattice pattern on the surface of the base member, it is preferable that each structure has an elliptical cone shape or a truncated elliptical cone shape of which the long-axis direction is parallel to the track extending direction and the slope of the central portion is greater than the slope of the front portion and the bottom portion thereof. By setting this shape, it is possible to improve the antireflection characteristic and the transmission characteristic.

In the above-mentioned configurations, when the structures form one of a hexagonal lattice pattern and a quasi-hexagonal lattice pattern on the surface of the base member, it is preferable that the height or depth of the structures in the track extending direction is smaller than the height or depth of the structures in the track arranging direction. When this condition is not satisfied, it is necessary to increase the arrangement pitch in the track extending direction, thereby decreasing the filling rate of the structures in the track extending direction. When the filling rate is decreased in this way, the antireflection characteristic deteriorates.

In the above-mentioned configurations, when the structures form one of a tetragonal lattice pattern and a quasi-tetragonal lattice pattern on the surface of the base member, an arrangement pitch P1 of the structures in the same track is greater than an arrangement pitch P2 of the structures in two adjacent tracks. Accordingly, since the filling rate of the structures having an elliptical cone shape or a truncated elliptical cone shape can be improved, it is possible to improve the antireflection characteristic.

When the structures form one of a tetragonal lattice pattern and a quasi-tetragonal lattice pattern on the surface of the base member, it is preferable that a ratio P1/P2 satisfies a relation of $1.4 < P1/P2 \leq 1.5$, where P1 represents an arrangement pitch of the structures in the same track and P2 represents an arrangement pitch of the structures in two adjacent tracks. By setting this numerical range, since the filling rate of the structures having an elliptical cone shape or a truncated elliptical cone shape can be improved, it is possible to improve the antireflection characteristic.

When the structures form one of a tetragonal lattice pattern and a quasi-tetragonal lattice pattern on the surface of the base member, it is preferable that each structure has an elliptical cone shape or a truncated elliptical cone shape of which the long-axis direction is parallel to the track extending direction and the slope of the central portion is greater than the slope of the front portion and the bottom portion thereof. By setting this shape, it is possible to improve the antireflection characteristic and the transmission characteristic.

When the structures form one of a tetragonal lattice pattern and a quasi-tetragonal lattice pattern on the surface of the base member, it is preferable that the height or depth of the structures in the direction forming 45 degree or about 45 degree with respect to the tracks is smaller than the height or depth of the structures in the track arranging direction. When this condition is not satisfied, it is necessary to increase the arrangement pitch in the direction forming 45 degree or about 45 degree with respect to the tracks, thereby decreasing the filling rate of the structures in the direction forming 45 degree or about 45 degree with respect to the tracks. When the filling rate is decreased in this way, the antireflection characteristic deteriorates.

In the above-mentioned configurations, the plural structures arranged on the surface of the base member with a fine pitch form plural lines of tracks and form one of a hexagonal lattice pattern, a quasi-hexagonal lattice pattern, a tetragonal lattice pattern, and a quasi-tetragonal lattice pattern in three adjacent lines of tracks. Therefore, it is possible to increase the filling rate of the structures to the surface and thus to increase the antireflection effect of the visible light, thereby providing an optical device with an excellent antireflection characteristic and high transmittance. When a recording technique of an optical disk is used to manufacture the structures, it is possible to efficiently manufacture the master used to manufacture the optical device for a short time and to cope with an increase in size of the base member, thereby improving the productivity of the optical device. When the fine arrangement of the structures is provided to a light exit surface in addition to a light entrance surface, it is possible to further improve the transmission characteristic.

As described above, it is possible to provide an optical device with an excellent antireflection characteristic.

Additional features and advantages are described herein, and will be apparent from, the following Detailed Description and the figures.

DETAILED DESCRIPTION

Figure 1A:
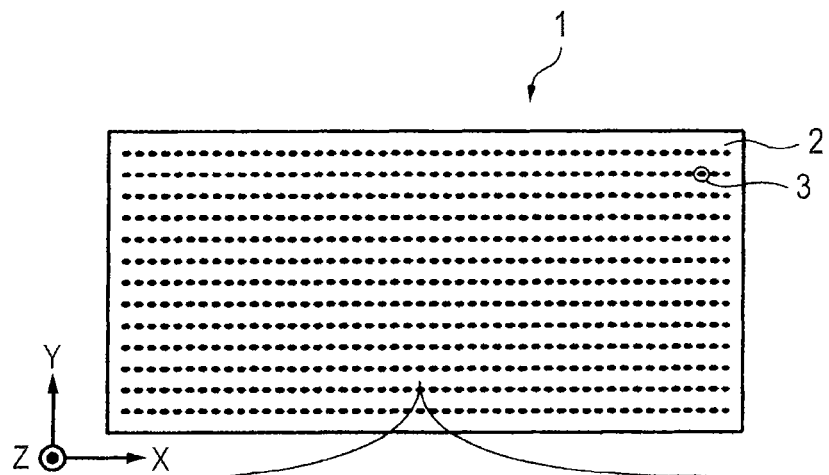
FIG. 1A is a plan view schematically illustrating a configuration of an optical device according to a first embodiment.

Embodiments will be described in the following order. In the drawings, like or corresponding elements are referenced by like reference numerals and signs.

1. First Embodiment (Example where structures are two-dimensionally arranged in a hexagonal lattice shape)
2. Second Embodiment (Example where structures are two-dimensionally arranged in a tetragonal lattice shape)
3. Third Embodiment (Example where structures are arranged in a meandering shape)
4. Fourth Embodiment (Example where concave structures are formed on the surface of a base member)
5. Fifth Embodiment (First Application to Display Apparatus)
6. Sixth Embodiment (Second Application to Display Apparatus)

1. First Embodiment

Configuration of Optical Device

Figure 1B:
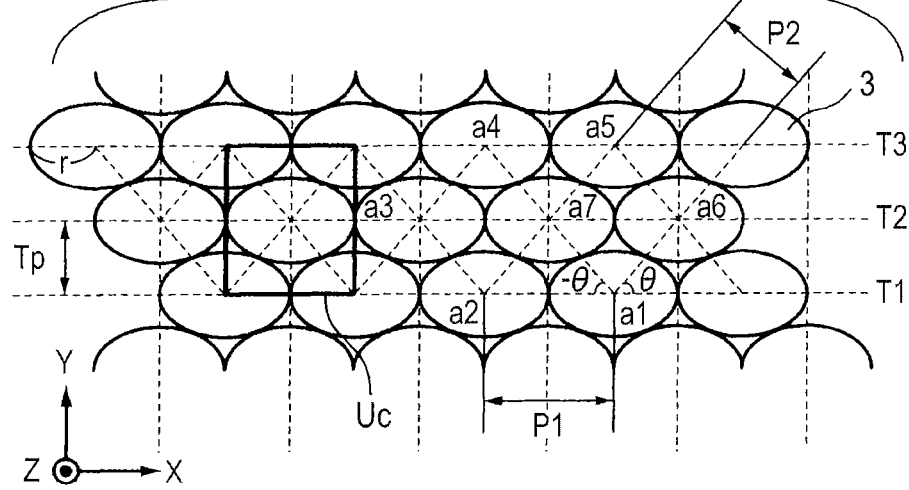
FIG. 1B is a partially-enlarged plan view illustrating the optical device shown in FIG. 1A.
Figure 1C:
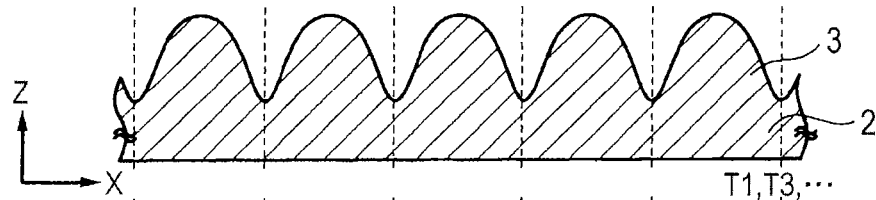
FIG. 1C is a sectional view of tracks T1, T3, . . . shown in FIG. 1B.
Figure 1D:
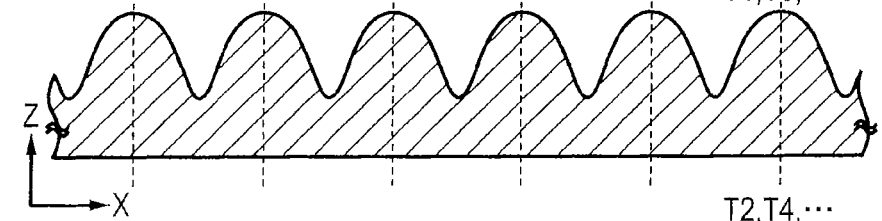
FIG. 1D is a sectional view of tracks T2, T4, . . . shown in FIG. 1B.
Figure 1E:
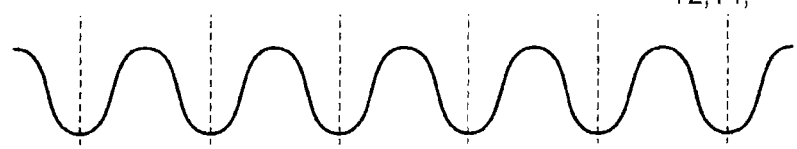
FIG. 1E is a diagram schematically illustrating a modulation waveform of a laser beam used to form latent images of tracks T1, T3, . . . shown in FIG. 1B.
Figure 1F:
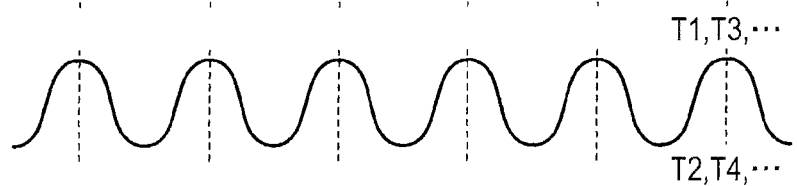
FIG. 1F is a diagram schematically illustrating a modulation waveform of a laser beam used to form latent images of tracks T2, T4, . . . shown in FIG. 1B.

FIG. 1A is a plan view schematically illustrating a configuration of an optical device according to a first embodiment of the invention, FIG. 1B is a partially-enlarged plan view illustrating the optical device shown in FIG. 1A, FIG. 1C is a sectional view of tracks T1, T3, ... shown in FIG. 1B, FIG. 1D is a sectional view of tracks T2, T4, ... shown in FIG. 1B, FIG. 1E is a diagram schematically illustrating a modulation waveform of a laser beam used to form latent images of tracks T1, T3, ... shown in FIG. 1B, and FIG. 1F is a diagram schematically illustrating a modulation waveform of a laser beam used to form latent images of tracks T2, T4, ... shown in FIG. 1B. FIGS. 2, 4, 5, and 6 are partially-enlarged perspective views illustrating the optical device 1 shown in FIG. 1A. FIG. 3A is a sectional view taken along a track extending direction (X direction (hereinafter, may be properly referred to as "track direction")) in the optical device shown in FIG. 1A and FIG. 3B is a sectional view taken along a θ direction in the optical device shown in FIG. 1A.

The optical device 1 is suitably used for various optical devices such as displays, optical electronics, optical communications (optical fibers), solar cells, and illuminating devices. For example, the optical device can be used in an antireflection substrate or a light guide plate for the antireflection of light with a wavelength band of visible light. The optical device can be also used in an optical filter having transmittance depending on an incidence angle of incident light and a back light device employing this optical filter.

The optical device 1 according to the first embodiment of the invention has a configuration in which plural structures 3 formed of a convex portion are arranged on the surface of a base member 2 with a pitch substantially equal to the wavelength of visible light. The optical device 1 has a function of preventing the reflection, which passes through the base member 2 in the Z direction in FIG. 2, at the boundaries between the structures 3 and the ambient air. Here, "equal to or less than the wavelength of visible light" means a wavelength of about 400 nm or less.

The base member 2 is a transparent base member with transparency and is formed of a transparent synthetic resin such as poly carbonate (PC) or poly ethylene terephthalate (PET) or glass as a main component. The base member 2 can have, for example, a film shape, a sheet shape, a plate shape, or a block shape, but is not limited to these shapes. It is preferable that the shape of the base member 2 is selected depending on the shapes of body portions of various optical devices such as displays, optical electronics, optical communications (optical fibers), solar cells, and illuminating devices requiring a predetermined antireflection function. It is also preferable that the shape of the base member is selected depending on the shapes of sheet-like or film-like antireflection components fitted to the optical devices.

Structures 3 of the optical device 1 are arranged to form plural lines of tracks T1, T2, T3, . . . (hereinafter, also generally referred to as "tracks T") on the surface of the base member 2. In the invention, a track means a portion in which the structures 3 are arranged in a straight line. The arranging direction means a direction perpendicular to the track extending direction (X direction) on the shaping surface of the base member 2.

In two adjacent tracks T of the structures 3, the structures 3 of one track (for example, T1) are disposed at intermediate positions (positions deviated by a half pitch) of the structures 3 arranged in the other track (for example, T2). As a result, as shown in FIG. 1B, the structures 3 are arranged to form a hexagonal lattice pattern or a quasi-hexagonal lattice pattern in which the centers of the structures 3 are located at points a1 to a7 in three adjacent tracks (T1 to T3). In the invention, the quasi-hexagonal lattice pattern means a hexagonal lattice pattern distorted by stretching a regular hexagonal lattice pattern in the track extending direction (X direction).

By arranging the structures 3 to form the quasi-hexagonal lattice pattern, as shown in FIG. 1B, the arrangement pitch P1 (distance between a1 and a2) of the structures 3 in the same track (for example, T1) is greater than the arrangement pitch of the structures 3 between two adjacent tracks (for example, T1 and T2). That is, the arrangement pitch of the structures in the same track is greater than the arrangement pitch P2 (for example, the distance between a1 and a7 and the distance between a2 and a7) of the structures 3 in the direction oblique by about ±60° with respect to the track extending direction. By arranging the structures 3 in this way, it is possible to further improve the filling density of the structures 3.

Figure 2:
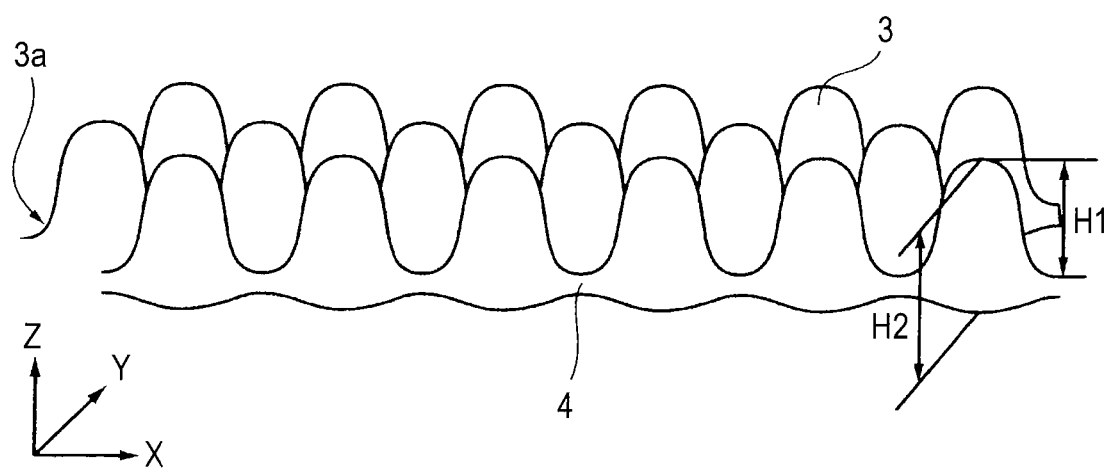
FIG. 2 is a partially-enlarged perspective view illustrating the optical device shown in FIG. 1A.
Figure 3A:
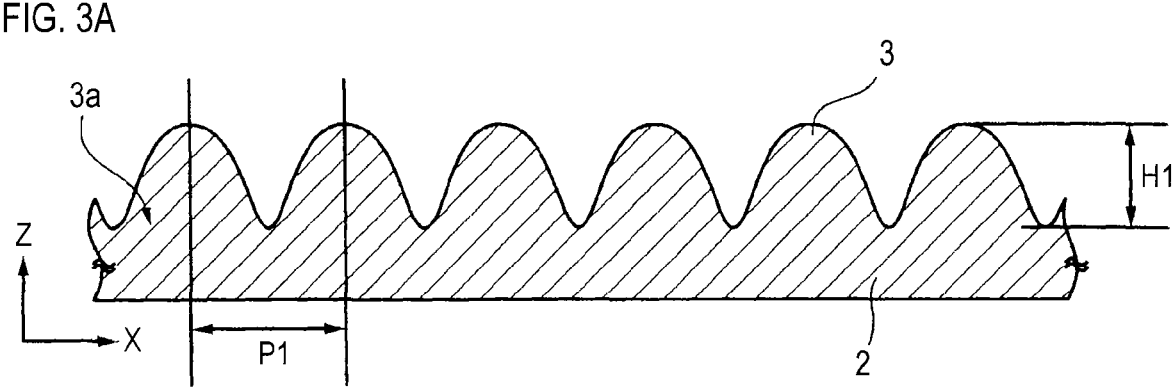
FIG. 3A is a sectional view taken along a track extending direction in the optical device shown in FIG. 1A
Figure 3B:
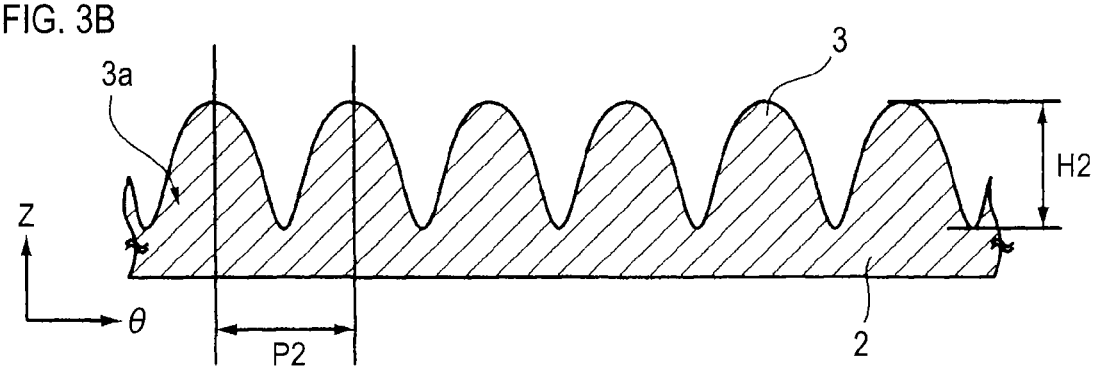
FIG. 3B is a sectional view taken along a θ direction in the optical device 1 shown in FIG. 1A.
Figure 4:
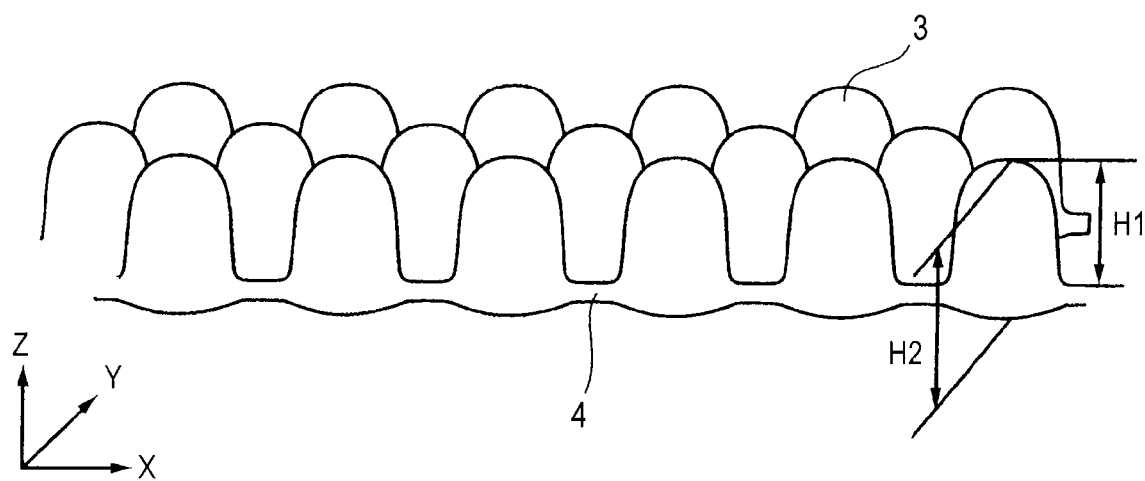
FIG. 4 is a partially-enlarged perspective view illustrating the optical device 1 shown in FIG. 1A.
Figure 5:
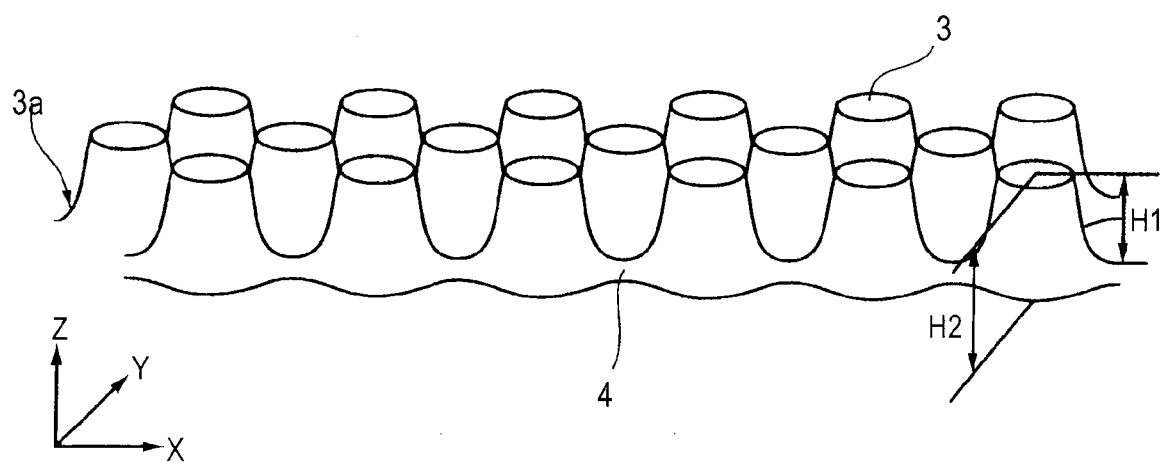
FIG. 5 is a partially-enlarged perspective view illustrating the optical device 1 shown in FIG. 1A.

As shown in FIGS. 2 and 4, it is preferable that the structures 3 have an elliptical cone shape of which the top vertex is curved in a conical structure in which the bottom surface has an elliptical, oval or ovoid shape having a long axis and a short axis. Alternatively, as shown in FIG. 5, it is preferable that the structures have a truncated elliptical cone shape of which the top vertex is flat in a conical structure in which the bottom surface has an elliptical, oval or ovoid shape having a long axis and a short axis. By setting the shape of each of the structures in this way, it is possible to improve the filling rate in the arranging direction. From the viewpoint of improving the reflection characteristic and the transmission characteristic, it is preferable that each structure has an elliptical cone shape (see FIG. 2) in which the slope of the central portion is more rapid than those of the bottom portion and the top portion or a truncated elliptical cone shape (see FIG. 5) in which the top vertex is flat. When the structures 3 have an elliptical cone shape or a truncated elliptical cone shape, it is preferable that the long-axis direction of the bottom surface is parallel to the track extending direction. The structures 3 have the same shape in FIG. 1, but the shape of the structures 3 is not limited to it. Two or more shapes of structures 3 may be formed on the surface of the base member. The structures 3 may be formed integrally with the base member 2.

Figure 6:
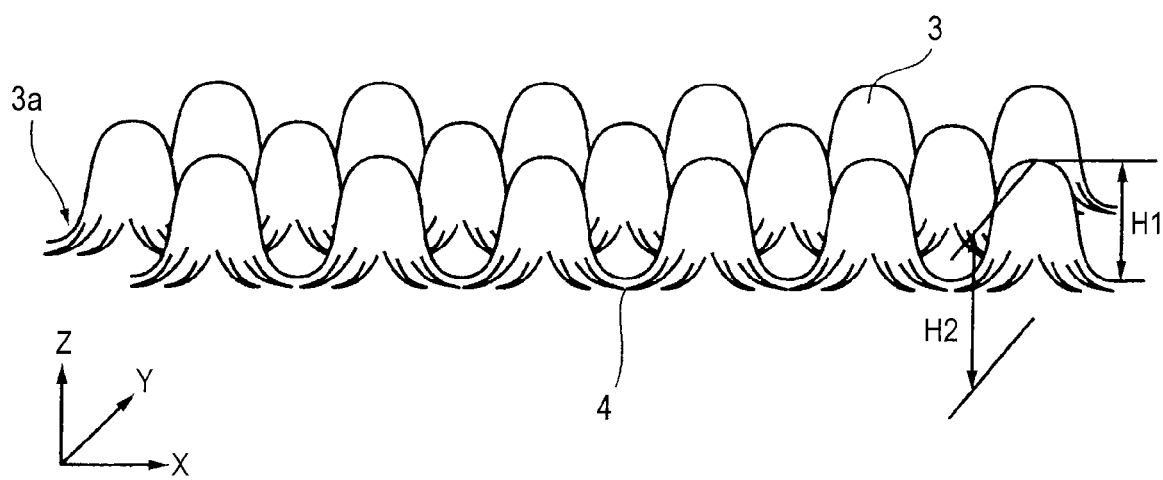
FIG. 6 is a partially-enlarged perspective view illustrating the optical device 1 shown in FIG. 1A.

As shown in FIG. 2 and FIGS. 4 to 6, it is preferable that a protruding portion 4 is disposed in a part or all around each structure 3. Accordingly, even when the filling rate of the structures 3 is low, it is possible to suppress the reflectance. Specifically, the protruding portions 4 may be provided between neighboring structures 3, as shown in FIGS. 2, 4, and 5. A thin and long protruding portion 4 may be provided in all of the area surrounding each structure 3, as shown in FIG. 6. The sectional shape of the protruding portion 4 can be triangular or rectangular, but is not limited to these shapes and can be selected in consideration of ease in shaping and the like. Rough shapes may be formed on all or a fraction of the surface surrounding each structure 3. Specifically, the rough shape may be formed on the surface between adjacent structures 3.

The structures 3 are not limited to the convex shape shown in the drawings, but may be formed of concave portions formed on the surface of the base member 2. The height of the structures 3 is not particularly limited, and is, for example, about 420 nm and specifically in the range of 415 nm to 421 nm. When the structures 3 are formed in concave shapes, the height corresponds to the depth of the structures 3.

It is preferable that the height H1 of the structures 3 in the track extending direction is smaller than the height H2 of the structures 3 in the arranging direction. That is, it is preferable that the heights H1 and H2 of the structures 3 satisfy a relation of H1<H2. When the structures 3 are arranged to satisfy H1≥H2, the arrangement pitch P1 in the track extending direction needs to be increased and thus the filling rate of the structures 3 in the track extending direction is lowered. The lowering of the filling rate causes the deterioration in the reflection characteristic.

The aspect ratios of the structures 3 are not limited to a constant value, but the structures 3 may be formed to have a constant height distribution (for example, in the range of aspect ratio of 0.83 to 1.46). By providing the structures 3 having the height distribution, it is possible to reduce the wavelength dependence of the reflection characteristic. Therefore, it is possible to provide an optical device 1 with an excellent antireflection characteristic.

Here, the height distribution means that the structures 3 having two types of height (depth) are provided on the surface of the base member 2. That is, the structures 3 having a reference height and the structures 3 having a height greater than the reference height are provided on the surface of the base member 2. The structures 3 having a height different from the reference height are provided, for example, periodically or non-periodically (randomly) on the surface of the base member 2. The direction of the periodicity may be, for example, the track extending direction or the track arranging direction.

It is preferable that a skirt portion 3a is provided to the peripheral edges of the structures 3. This is because an optical device can be easily peeled off from a mold in manufacturing the optical device. From the viewpoint of the peeling characteristic, the skirt portion 3a has a curved surface of which the height slowly decreases. The skirt portion 3a may be provided to only a part of the peripheral edge of each structure 3, but it is preferable from the viewpoint of improving the peeling characteristic that the skirt portion is provided to all the peripheral edge of the structure 3. When the structures 3 are concave, the skirt portion is a curved portion provided to the opening edge of the concave portion as the structure 3.

The height (depth) of the structures 3 is not particularly limited, but can be properly set depending on the wavelength band of light to be transmitted and can be set, for example, to the range of 236 nm to 450 nm. The aspect ratio (height/pitch) of the structures 3 is preferably set to the range of 0.81 to 1.46 and more preferably to the range of 0.94 to 1.28. When the aspect ratio is less than 0.81, the reflection characteristic and the transmission characteristic tend to deteriorate. When the aspect ratio is greater than 1.46, the peeling characteristic tends to deteriorate in manufacturing an optical device, thereby not clearly acquiring the replica.

From the viewpoint of improvement in reflection characteristic, it is preferable that the aspect ratio of the structures 3 is set to the range of 0.94 to 1.46. From the viewpoint of improving the transmission characteristic, it is preferable that the aspect ratio of the structures 3 is set to the range of 0.81 to 1.28.

The aspect ratio in the invention is defined by Expression 1.

$$\text{Aspect ratio} = H/P \qquad \text{Expression 1}$$

Here, H represents the height of the structure and P represents the average arrangement pitch (average period).

The average arrangement pitch P is defined by Expression 2.

$$\text{Average arrangement pitch } P = (P1+P2+P2)/3 \qquad \text{Expression 2}$$

Here, P1 represents the arrangement pitch in the track extending direction (period in the track extending direction) and P2 represents the arrangement pitch (period in the θ direction) in the direction forming ±θ with respect to the track extending direction (where θ=60°−δ and δ satisfies preferably 0°<δ≤11° and more preferably) 3°≤δ≤6°).

The height H of the structures 3 means the height of the structures 3 in the arranging direction. Since the height of the structures 3 in the track extending direction (X direction) is smaller than the height in the arranging direction (Y direction) and the height of the structures 3 in directions other than the track extending direction is almost equal to the height in the arranging direction, the height of the sub-wavelength structures is represented by the height in the arranging direction. However, when the structures 3 are concave portions, the height H of the structures in Expression 1 is replaced with the depth H of the structures.

When the arrangement pitch of the structures 3 in the same track is represented by P1 and the arrangement pitch of the structures 3 between two adjacent tracks is represented by P2, it is preferable that the ratio P1/P2 satisfies 1.001≤P1/P2≤1.1 or 1.00<P1/P2≤1.1. By setting this numerical range, it is possible to enhance the filling rate of the structures 3 having an elliptical cone shape or a truncated elliptical cone shape, thereby improving the antireflection characteristic.

The filling rate of the structures 3 on the surface of the base member is in the range of 65% or more, preferably in the range of 73% or more, and more preferably in the range of 86% or more, where the upper limit is 100%. By setting the filling rate to this range, it is possible to improve the antireflection characteristic. To enhance the filling rate, it is preferable that the lower portions of the adjacent structures 3 are bonded to each other or the structures 3 are distorted by adjusting the ellipticity of the bottom surfaces of the structures.

Here, the filling rate (average filling rate) of the structures 3 is calculated as follows.

First, the surface of the optical device 1 is photographed as a top view by the use of a scanning electron microscope (SEM). Then, a unit lattice Uc is randomly selected from the photographed SEM picture and the arrangement pitch P1 of the unit lattice Uc and the track pitch Tp are measured (see FIG. 11B). The area S of the bottom surface of the structure 3 located at the center of the unit lattice Uc is measured by image processing. Then, the filling rate is calculated by Expression 3 using the arrangement pitch P1, the track pitch Tp, and the area S of the bottom surface.

$$\text{Filling rate} = (S(\text{hex.})/S(\text{unit})) \times 100 \qquad \text{Expression 3}$$

Here, the area of the unit lattice is S(unit)=P1×2Tp and the area of the bottom surface of the structure located in the unit lattice is S(hex.)=2S.

The above-mentioned filling rate calculating process is performed with 10 unit lattices being randomly selected from the SEM picture. The measured values are simply averaged (arithmetic average) to obtain the average of the filling rate and this is set as the filling rate of the structures 3 on the surface of the base member.

When the structures 3 overlap or sub structures such as the protruding portions 4 exist between the structures 3, the filling rate can be calculated by determining the area ratio using 5% of the height of the structures 3 as a threshold value.

Figure 7:
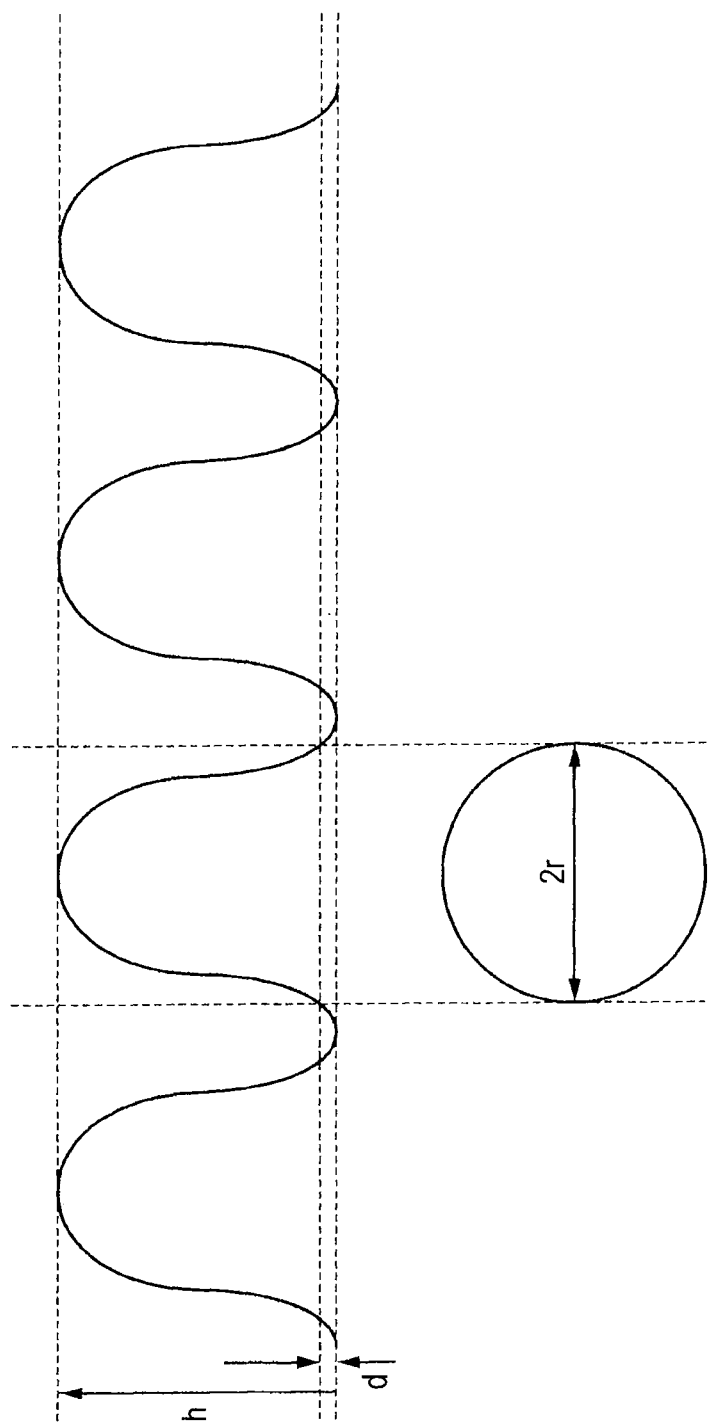
FIG. 7 is a diagram illustrating a method of setting bottom surfaces of structures when boundaries of the structures are unclear.
Figure 8A:
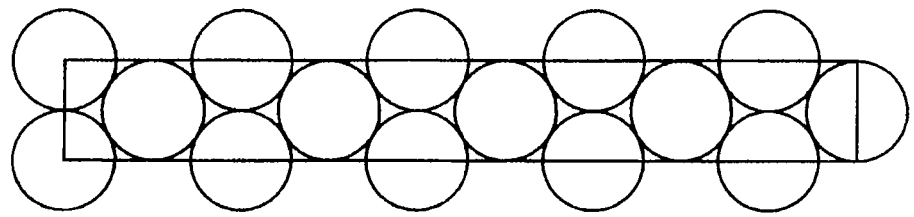
FIGS. 8A to 8D are diagrams illustrating shapes of the bottom surfaces when the ellipticity of the bottom surfaces of the structures is changed.
Figure 8B:
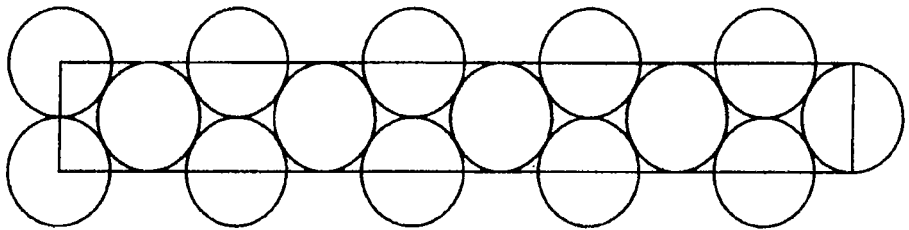
Figure 8C:
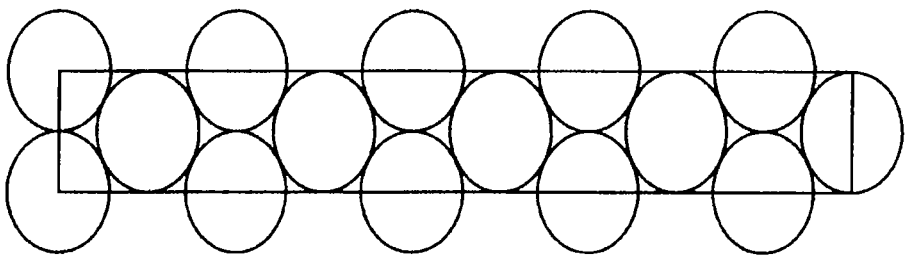
Figure 8D:
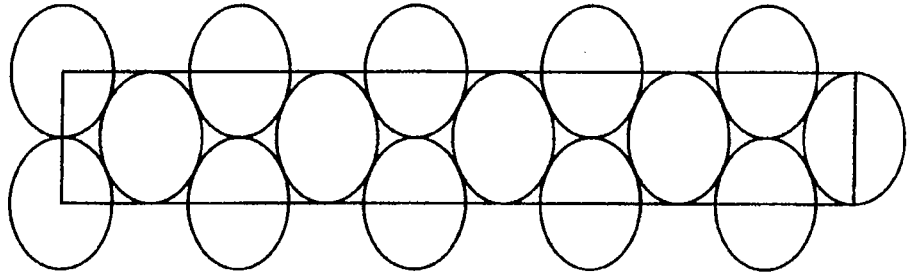

FIG. 7 is a diagram illustrating the filling rate calculating method when the boundaries of the structures 3 are unclear. When the boundaries of the structures 3 are unclear, as shown in FIG. 7, the filling rate is calculated by observing the section with the SEM, using 5% (=(d/h)×100) of the height h of the structures 3 as a threshold value, and converting the diameter of the structures 3 with the height d. When the bottom surfaces of the structures 3 are elliptical, the same process is performed on the long axis and the short axis.

FIG. 8 is a diagram illustrating the shapes of the bottom surfaces when the ellipticity of the bottom surfaces of the structures 3 is changed. The ellipticities of the ellipses shown in FIGS. 8A to 8D are respectively 100%, 110%, 120%, and 141%. By changing the ellipticity in this way, it is possible to change the filling rate of the structures 3 on the surface of the base member. When the structures 3 for a quasi-hexagonal lattice pattern, the ellipticity e of the bottom surfaces of the structures is preferably in the range of 100%<e<150%. By setting the ellipticity to this range, it is possible to enhance the filling rate of the structures 3, thereby obtaining an excellent antireflection characteristic.

Here, the ellipticity e is defined as (a/b)×100, where a represents the diameter of the bottom surfaces of the structure in the track direction (X direction) and b represents the diameter in the arranging direction (Y direction) perpendicular thereto. The diameters a and b of the structures 3 are calculated as follows. The surface of the optical device 1 is photographed in a top view with the SEM (Scanning Electron Microscope) and 10 structures 3 are randomly extracted from the photographed SEM picture. Then, the diameters a and b of the bottom surface of the respective extracted structures 3 are measured. The measured values a and b are simply averaged (arithmetic average) to calculate the averages of the diameters a and b, which are set as the diameters a and b of the structure 3.

Figure 9A:
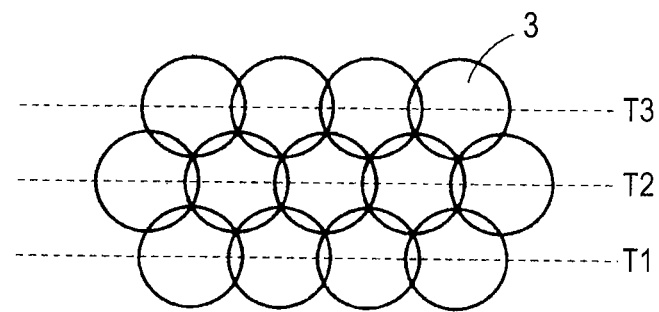
FIG. 9A is a diagram illustrating an arrangement of structures having a cone shape or a truncated cone shape and FIG. 9B is a diagram illustrating an arrangement of structures 3 having an elliptical cone shape or a truncated elliptical cone shape.
Figure 9B:
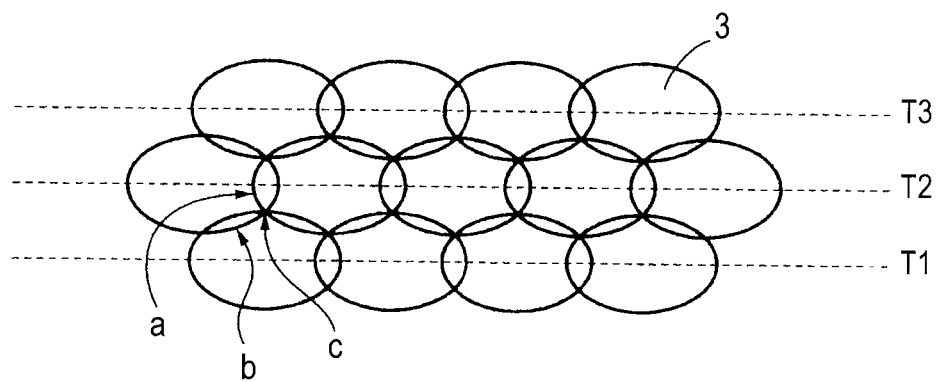

FIG. 9A is a diagram illustrating an arrangement of the structures 3 having a cone shape or a truncated cone shape. FIG. 9B is a diagram illustrating an arrangement of the structures 3 having an elliptical cone shape or a truncated elliptical cone shape. As shown in FIGS. 9A and 9B, it is preferable that the structures 3 are joined together so that the bottom portions overlap with each other. Specifically, it is preferable that the bottom portion of each structure 3 is joined to a part or all of the bottom portions of the adjacent structures 3. More specifically, it is preferable that the bottom portions of the structures 3 are joined together in the track direction, or in the θ direction, or in both directions. More specifically, it is preferable that the bottom portions of the structures 3 are joined together in the track direction, or in the θ direction, or in both directions. In FIGS. 9A and 9B, the entire bottom portions of the adjacent structures 3 are joined. By joining the structures 3 in this way, it is possible to enhance the filling rate of the structures 3. It is preferable that the structures are joined together by a quarter or less of the maximum of the wavelength band of used light in terms of the optical length in consideration of the refractive index. Accordingly, it is possible to provide an excellent antireflection characteristic.

As shown in FIG. 9B, when the bottom portions of the structures 3 having an elliptical cone shape or a truncated elliptical cone shape are joined together, for example, the heights of the joined portions are reduced, for example, in the order of joined portions a, b, and c.

The ratio ($(2r/P1) \times 100$) of the diameter 2r to the arrangement pitch P1 is 85% or more, preferably 90% or more, and more preferably 95% or more. By setting the ratio to this range, it is possible to enhance the filling rate of the structures 3 and to improve the antireflection characteristic. When the ratio (($2r/P1) \times 100$) is excessively great and the structures 3 excessively overlap with each other, the antireflection characteristic tends to deteriorate. Therefore, it is preferable that the upper limit of the ratio (($2r/P1) \times 100$) is set so that the structures are joined together by a quarter or less of the maximum of the wavelength band of used light in terms of the optical length in consideration of the refractive index. Here, the arrangement pitch P1 is the arrangement pitch of the structures 3 in the track direction and the diameter 2r is the diameter of the bottom surfaces of the structures in the track direction. When the bottom surfaces of the structures are circular, the diameter 2r is the diameter of the circle. When the bottom surfaces of the structures are elliptical, the diameter 2r is the long-axis diameter.

Configuration of Roll Master

Figure 10A:
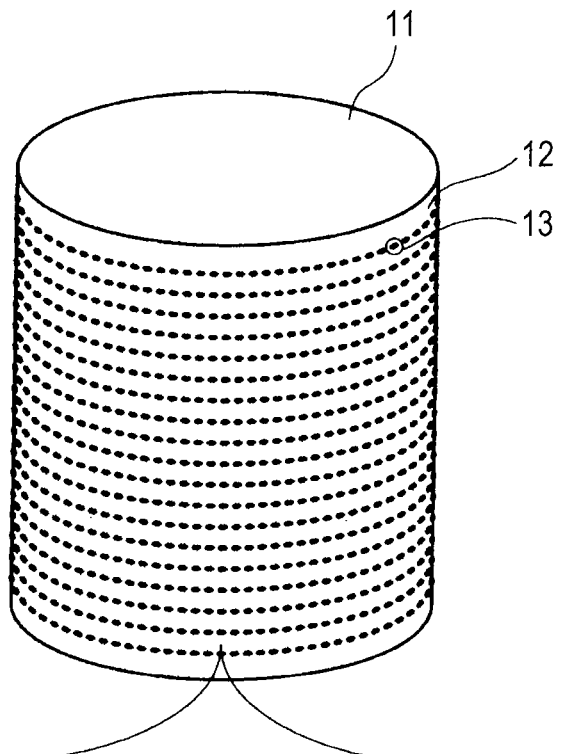
FIG. 10A is a perspective view illustrating a configuration of a roll master used to manufacture an optical device and FIG. 10B is a plan view illustrating a configuration of the roll master used to manufacture an optical device.

FIG. 10 is a diagram illustrating a roll master used to manufacture an optical device having the above-mentioned configuration. As shown in FIG. 10, a roll master 11 has a configuration in which plural structures 13 as concave portions are arranged on the surface of a master 12 with the same pitch as the wavelength of visible light. The master 12 has a columnar or cylindrical shape. The material of the master 12 can employ, for example, glass, but the material is not particularly limited. Two-dimensional patterns are spatially linked with a roll master exposure device to be described later, a signal is generated by synchronizing a rotation controller of a recording apparatus with a polarity inverting formatter signal for each track, and the master is patterned with a proper transfer pitch by the use of a CAV. Accordingly, it is possible to record a hexagonal lattice pattern or quasi-hexagonal lattice pattern. By properly setting the frequency of the polarity inverting formatter signal and the number of revolutions of a roll, lattice patterns with a constant spatial frequency are formed in a desired recording area.

Method of Manufacturing Optical Device

Figure 11:
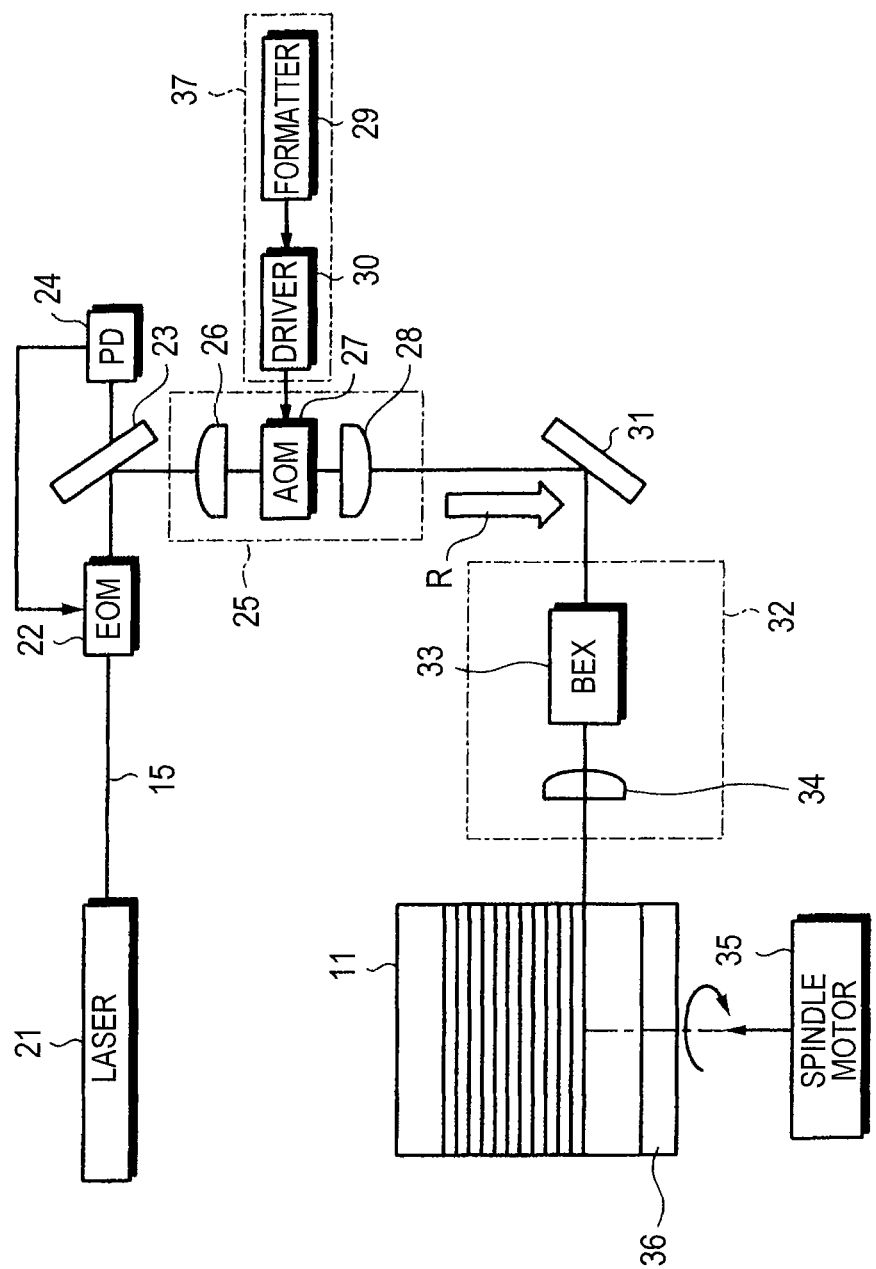
FIG. 11 is a diagram schematically illustrating a configuration of a roll master exposure apparatus.

A method of manufacturing the optical device 1 having the above-mentioned configuration will be described now with reference to FIGS. 11 to 13.

The method of manufacturing the optical device according to the first embodiment includes a resist film forming step of forming a resist layer on a master, an exposure step of forming latent images of moth-eye patterns on the resist layer using a roll master exposure device, a developing step of developing the resist layer having the latent images formed thereon, an etching step of manufacturing a roll master by plasma etching, and a replication step of manufacturing a replicated substrate using UV-curable resin.

Configuration of Exposure Device

The configuration of the roll master exposure device used in the step of exposing the moth-eye patterns will be first described with reference to FIG. 11. The roll master exposure device is based on an optical disk recording device.

A laser source 21 is a light source for exposing a resist formed on the surface of the master 12 as a recording medium and emits a recording laser beam 15 with a wavelength of $\lambda = 266$ nm. The laser beam 15 emitted from the laser source 21 travels straightly as a collimated beam and is incident on an electro-optical modulator (EOM) 22. The laser beam 15 transmitted by the electro-optical modulator 22 is reflected by a mirror 23 and is guided to a modulation optical system 25.

The mirror 23 is constructed by a polarization beam splitter and has a function of reflecting one polarization component and transmitting the other polarization component. The polarization component passing through the mirror 23 is received by a photo diode 24 and the electro-optical modulator 22 is controlled on the basis of the received signal to modulate the phase of the laser beam 15.

In the modulation optical system 25, the laser beam 15 is concentrated on an acousto-optic modulator (AOM) 27 formed of glass ($SiO_2$), or the like, by a condenser lens 26. The laser beam 15 is modulated by and output from the acousto-optic modulator 27 and then collimated by a lens 28. The laser beam 15 emitted from the modulation optical system 25 is reflected by a mirror 31 and is horizontally or vertically guided to a movable optical table 32.

The movable optical table 32 includes a beam expander 33 and an objective lens 34. The laser beam 15 to the movable optical table 32 is shaped to a desired beam shape by the beam expander 33 and then is applied to the resist layer on the master 12 through the objective lens 34. The master 12 is placed on a turn table 36 connected to a spindle motor 35. By intermittently applying the laser beam 15 to the resist layer while rotating the master 12 and moving the laser beam 15 in the height direction of the master 12, the resist layer exposing step is performed. The formed latent images have an almost elliptical shape of which the long axis is parallel to the peripheral direction. The movement of the laser beam 15 is carried out by moving the movable optical table 32 in the direction of arrow R.

The exposure device includes a control mechanism 37 for forming the latent images corresponding to the two-dimensional patterns of the hexagonal lattice or the quasi-hexagonal lattice shown in FIG. 1B on the resist layer. The control mechanism 37 includes a formatter 29 and a driver 30. The formatter 29 includes a polarity inverting unit and this polarity inverting unit controls the application time of the laser beam 15 to the resist layer. The driver 30 receives the output of the polarity inverting unit and controls the acousto-optic modulator 27.

Figure 10B:
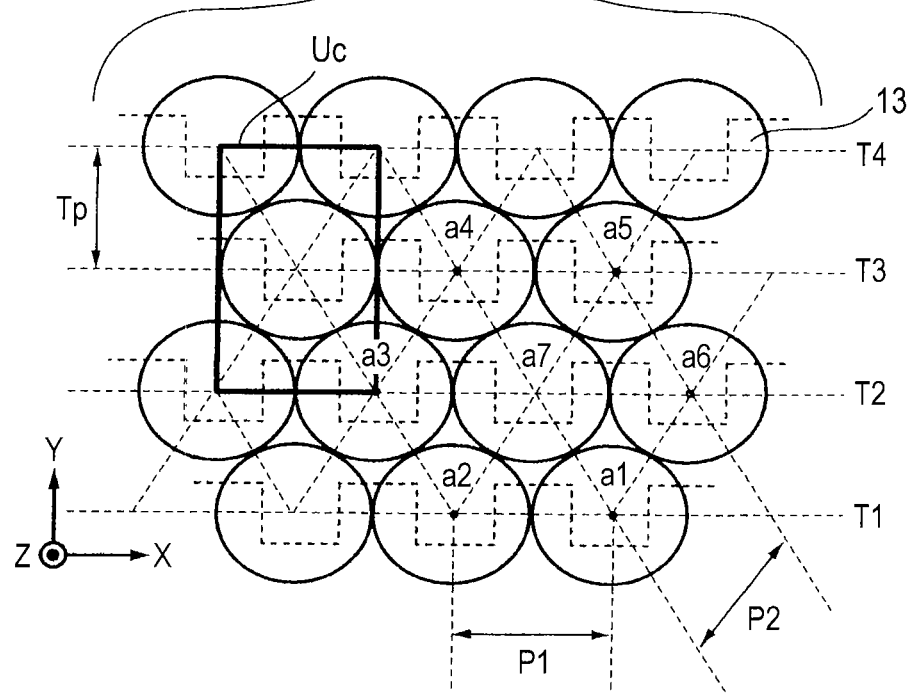

In the roll master exposure device, a signal is generated by synchronizing the rotation controller of the recording device with the polarity inverting formatter signal for each track so as to spatially link the two-dimensional patterns and the intensity thereof is modulated by the use of the acousto-optic modulator 27. By patterning with a constant angular velocity (CAV), a proper number of revolutions, a proper modulation frequency, and a proper transfer pitch, it is possible to record the hexagonal lattice or quasi-hexagonal lattice patterns. For example, as shown in FIG. 10B, the transfer pitch can be set to 251 nm to set the period in the peripheral direction to 315 nm and to set the period in the direction oblique by about 60 degree (about −60 degree) with respect to the peripheral direction to 300 nm (Pythagorean theorem). The frequency of the polarity inverting formatter signal is changed depending on the number of revolutions (1800 rpm, 900 rpm, and 450 rpm) of the roll (see Table 1). The quasi-hexagonal lattice patterns with the constant spatial frequency (where the period in the peripheral direction is 315 nm and the period in the direction oblique by about 60 degree (about −60 degree) with respect to the peripheral direction is 300 nm) in the desired recording area are obtained by expanding the far UV laser beam to five times beam diameter by the use of the beam expander (BEX) 33 of the movable optical table 32 and applying the laser beam to the resist layer of the master 12 through the objective lens 34 with the number of aperture (NA) of 0.9 to form fine latent images.

TABLE 1

| Number of Revolutions [rpm] | 1800 | 900 | 450 | 225 |
|---|---|---|---|---|
| Moth-eye [Mhz] | 37.70 | 18.85 | 9.43 | 4.71 |

The steps of the method of manufacturing an optical device according to the first embodiment of the invention will be sequentially described now.

Resist Film Forming Step

Figure 12A:
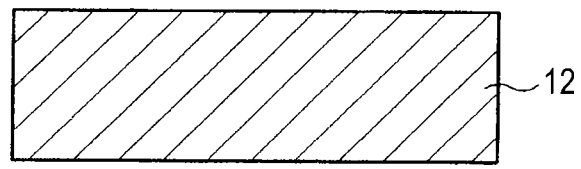
FIGS. 12A to 12C are diagrams illustrating a method of manufacturing an optical device according to a first embodiment.
Figure 12B:
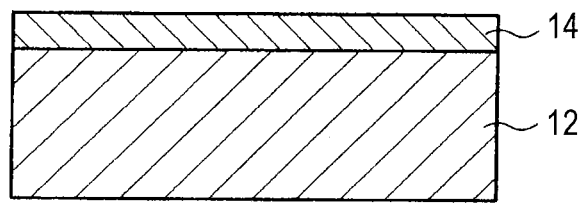
Figure 13:
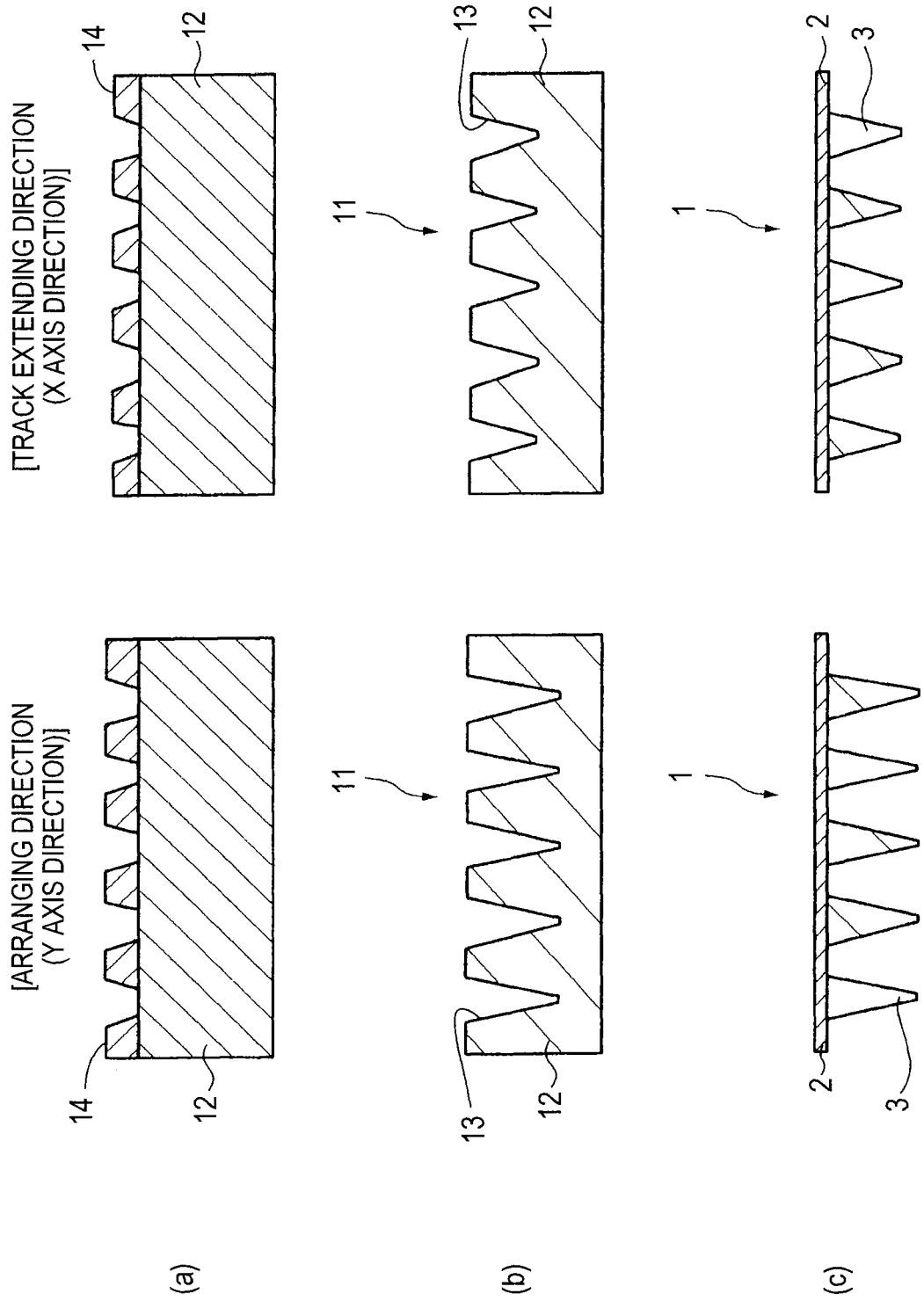
FIGS. 13A to 13C are diagrams illustrating the method of manufacturing the optical device according to the first embodiment.

First, as shown in FIG. 12A, a columnar master 12 is prepared. The master 12 is, for example, a glass master. Then, as shown in FIG. 12B, a resist layer 14 is formed on the surface of the master 12. The resist layer 14 may be formed of, for example, one of organic resist and inorganic resist. For example, novolac resist or chemically-amplified resist can be used as the organic resist. For example, metal oxide including one or two or more types of transition metal tungsten or molybdenum can be used as the inorganic resist.

Exposure Step

Figure 12C:
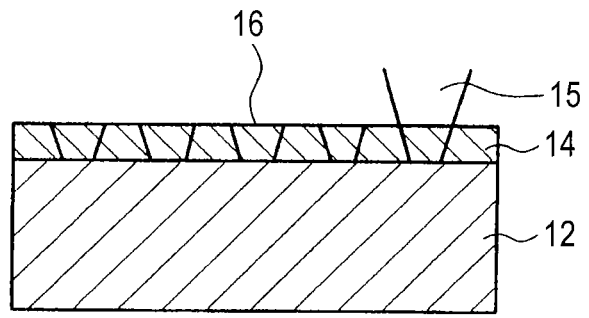

As shown in FIG. 12C, the laser beam (exposing beam) 15 is applied to the resist layer 14 while rotating the master 12 by the use of the above-mentioned roll master exposure device. At this time, by intermittently applying the laser beam 15 while moving the laser beam 15 in the height direction (direction parallel to the center axis of the columnar or cylindrical master 12) of the master 12, the entire surface of the resist layer 14 is exposed to the beam. Accordingly, the latent images 16 corresponding to the trace of the laser beam 15 are formed on the entire surface of the resist layer 14 with the same pitch as the wavelength of visible light.

The latent images 16 are arranged in plural lines of tracks on the surface of the master and form the hexagonal lattice patterns or the quasi-hexagonal lattice patterns. The latent images 16 have an elliptical shape of which the long axis is parallel to the track extending direction.

Developing Step

By dropping a developer onto the resist layer 14 while rotating the master 12, the resist layer 14 is developed as shown in FIG. 13A. As shown in the drawing, when the resist layer 14 is formed of a positive resist, the exposed portions exposed to the laser beam 15 have a higher dissolving speed in the developer than the non-exposed portions and thus patterns corresponding to the latent images (exposed portions) 16 are formed in the resist layer 14.

Etching Step

The surface of the master 12 is etched using the patterns (resist patterns) of the resist layer 14 formed on the master 12 as a mask. Accordingly, as shown in FIG. 13B, concave portions, that is, structures 13, having an elliptical cone shape or a truncated elliptical cone shape of which the long axis is parallel to the track extending direction can be obtained. This etching step employs, for example, a dry etching method. At this time, by alternately performing the etching process and an ashing process, for example, the patterns of the conical structures 13 can be formed. It is possible to manufacture a glass master with a depth (selectable ratio of 3 or more) three times greater than the thickness of the resist layer 14, thereby enhancing the aspect ratio of the structures 3.

In this way, for example, the roll master 11 having concave portions of a hexagonal lattice pattern or a quasi-hexagonal lattice pattern with a depth of 200 nm to 350 nm is obtained.

Replication Step

For example, the roll master 11 is brought into close contact with a base member 2, such as a sheet on which a transfer material is applied, and is then peeled off while hardening the transfer material by applying UV thereto. Accordingly, as shown in FIG. 13C, an optical device 1 such as a moth-eye UV-curable replicated sheet is manufactured.

The transfer material includes, for example, a UV-curable material and an initiator and further includes a filler or a functional additive as needed.

The UV-curable material includes, for example, monofunctional monomers, bifunctional monomers, or multifunctional monomers and specifically includes one or more of the following materials.

Examples of the monofunctional monomer can include carboxylic acids (acrylic acid), hydroxys (2-hydroxyethyl acrylate, 2-hydroxypropyl acrylate, 4-hydroxybutyl acrylate), alkyls, alicyclics (isobutyl acrylate, t-butyl acrylate, isooctyl acrylate, lauryl acrylate, stearyl acrylate, isobonyl acrylate, cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethylcarbitol acrylate, phenoxyethyl acrylate, N,N-dimethyl aminoethyl acrylate, N,N-dimethyl aminopropyl acryl amide, N,N-dimethyl acryl amide, acryloyl morpholine, N-isopropyl acryl amide, N,N-diethyl acryl amide, N-vinyl pyrrolidone, 2-(perfluoro octyl)ethyl acrylate, 3-perfluoro hexyl-2-hydroxypropyl acrylate, 3-perfluoro octyl-2-hydroxypropyl acrylate, 2-(perfluoro decyl)ethyl acrylate, 2-(perfluoro-3-methylbutyl)ethyl acrylate, 2,4,6-tribromophenol acrylate, 2,4,6-tribromophenol methacrylate, 2-(2,4,6-tribromophenoxy)ethyl acrylate), and 2-ethylhexyl acrylate.

Examples of the bifunctional monomer can include tri (propylene glycol)diacrylate, trimethylol propane diallyl ether, and urethane acrylate.

Examples of the multifunctional monomer can include trimethylol propane triacrylate, dipentaerythritol penta-/hexa-acrylate, and ditrimethylol propane tetraacrylate.

Examples of the initiator can include 2,2-dimethoxy-1,2-diphenyl ethan-1-one, 1-hydroxy-cyclohexyl phenyl ketone, and 2-hydroxy-2-methyl-1-phenylpropan-1-one.

For example, both inorganic particulates and organic particulates can be used as the filler. Examples of the inorganic particulates can include metal oxide particulates such as $SiO_2$, $TiO_2$, $ZrO_2$, $SnO_2$, and $Al_2O_3$.

Examples of the functional additive can include a leveling agent, a surface conditioner, and an antifoamer. Examples of the material of the base member 2 can include methyl methacrylate(co)polymer, polycarbonate, styrene(co)polymer, methyl methacrylate-styrene copolymer, cellulose diacetate, cellulose triacetate, cellulose acetate butylate, polyester, polyamide, polyimide, polyether sulfone, polysulfone, polypropylene, polymethyl pentene, polyvinyl chloride, polyvinyl acetal, polyether ketone, polyurethane, and glass.

The molding method of the base member 2 is not particularly limited, but may be an injection molded body, an extrusion molded body, or a cast molded body. As needed, surface treatment such as corona treatment may be performed on the surface of the base member.

2. Second Embodiment

Figure 14A:
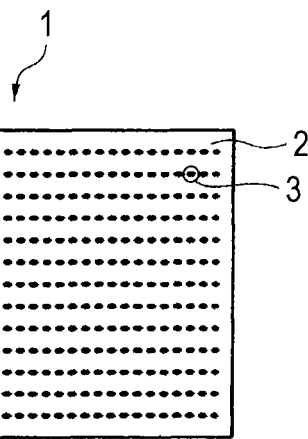
FIG. 14A is a plan view schematically illustrating a configuration of the optical device according to the first embodiment.
Figure 14B:
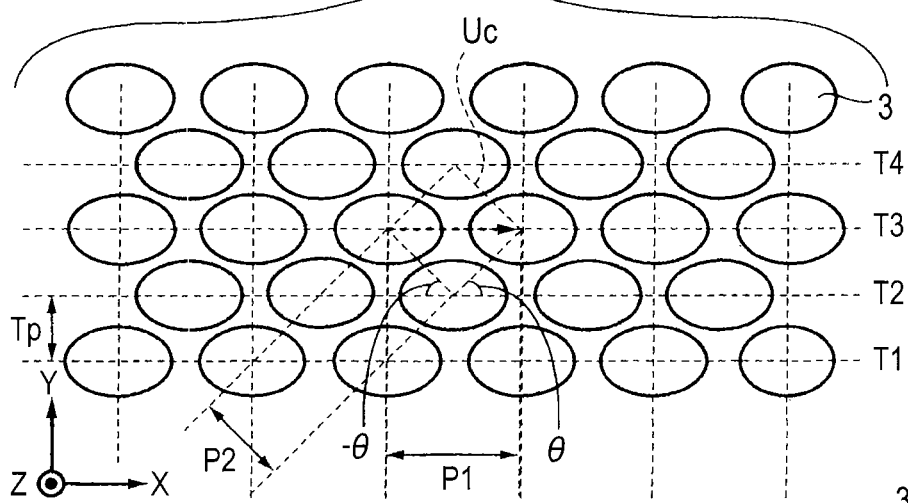
FIG. 14B is a partially-enlarged plan view illustrating the optical device shown in FIG. 14A.
Figure 14C:
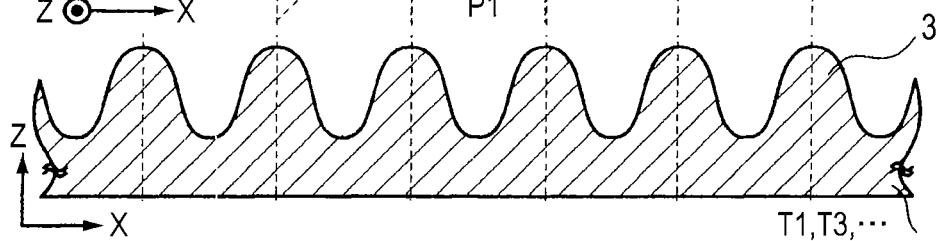
FIG. 14C is a sectional view of tracks T1, T3, . . . shown in FIG. 14B.
Figure 14D:
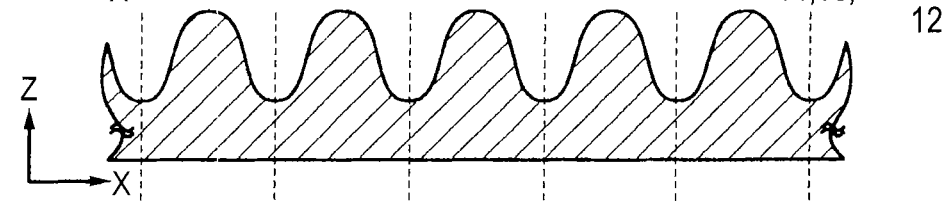
FIG. 14D is a sectional view of tracks T2, T4, . . . shown in FIG. 14B.
Figure 14E:
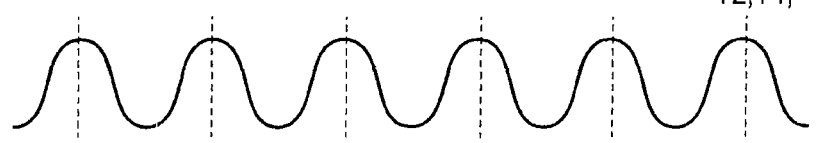
FIG. 14E is a diagram schematically illustrating a modulation waveform of a laser beam used to form latent images of tracks T1, T3, . . . shown in FIG. 14B.
Figure 14F:
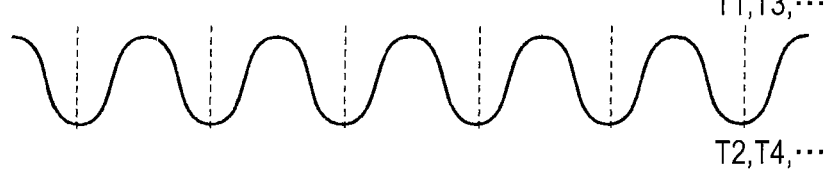
FIG. 14F is a diagram schematically illustrating a modulation waveform of a laser beam used to form latent images of tracks T2, T4, ... shown in FIG. 14B.

FIG. 14A is a plan view schematically illustrating a configuration of an optical device according to a second embodiment. FIG. 14B is a partially-enlarged plan view illustrating the optical device shown in FIG. 14A. FIG. 14C is a sectional view of tracks T1, T3, . . . shown in FIG. 14B. FIG. 14D is a sectional view of tracks T2, T4, . . . shown in FIG. 14B. FIG. 14E is a diagram schematically illustrating a modulation waveform of a laser beam used to form latent images of tracks T1, T3, . . . shown in FIG. 14B. FIG. 14F is a diagram schematically illustrating a modulation waveform of a laser beam used to form latent images of tracks T2, T4, . . . shown in FIG. 14B.

The optical device 1 according to the second embodiment is different from that according to the first embodiment, in that the structures 3 form a tetragonal lattice pattern or a quasi-tetragonal lattice pattern in three adjacent tracks. In the invention, the quasi-tetragonal lattice pattern means a tetragonal lattice pattern distorted by stretching a regular tetragonal lattice pattern in the track extending direction (X direction).

The height or depth of the structures 3 is not particularly limited and is, for example, in the range of 159 nm to 312 nm. The pitch P2 in the direction oblique by (about) 45 degree with respect to the tracks is, for example, in the range of 275 nm to 297 nm. The aspect ratio (height/arrangement pitch) of the structures 3 is, for example, in the range of 0.54 to 1.13. The height is not limited to the case where the aspect ratios of the structures 3 are the same, but the structures 3 may have a predetermined height distribution.

It is preferable that the arrangement pitch P1 of the structures 3 in the same track is greater than the arrangement pitch P2 of the structures 3 between two adjacent tracks. When the arrangement pitch of the structures 3 in the same track is P1 and the arrangement pitch of the structures 3 between two adjacent tracks is P2, it is preferable that P1/P2 satisfies the relation of $1.4 < P1/P2 \leq 1.5$. By setting this numerical range, it is possible to enhance the filling rate of the structures 3 having an elliptical cone shape or a truncated elliptical cone shape, thereby improving the antireflection characteristic. It is preferable that the height or depth of the structures 3 in the direction oblique by 45 degree or about 45 degree with respect to the tracks is smaller than the height or depth of the structures 3 in the track extending direction.

It is preferable that the height H2 in the arranging direction (θ direction) of the structures 3 oblique about the track extending direction is smaller than the height H1 of the structures 3 in the track extending direction. That is, it is preferable that the heights H1 and H2 of the structures 3 satisfy the relation of H1>H2.

Figure 41:
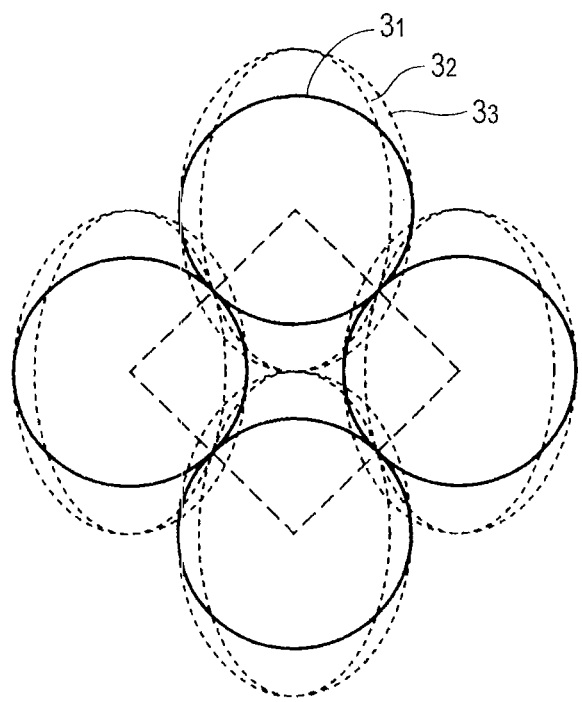
FIG. 41 is a diagram illustrating bottom surface shapes when the ellipticity of the bottom surfaces of the structures is changed.

FIG. 41 is a diagram illustrating the shapes of the bottom surfaces when the ellipticity of the bottom surfaces of the structures 3 is changed. The ellipticities of ellipses 31, 32, and 33 are 100%, 141%, and 163.3%, respectively. By changing the ellipticity, the filling rate of the structures 3 on the surface of the base member can be changed. When the structures 3 form the tetragonal lattice patterns or the quasi-tetragonal lattice patterns, it is preferable that the ellipticity e of the bottom surfaces of the structures is in the range of $150\% \leq e \leq 180\%$. This is because the filling rate of the structures 3 is increased by setting the ellipticity e within this range, whereby an excellent antireflection characteristic can be obtained.

The filling rate of the structures 3 on the surface of the base member is in the range of 65% or more, preferably in the range of 73% or more, and more preferably in the range of 86% or more, where the upper limit is 100%. By setting the filling rate to this range, it is possible to improve the antireflection characteristic.

Here, the filling rate (average filling rate) of the structures 3 is calculated as follows.

First, the surface of the optical device 1 is photographed as a top view by the use of a scanning electron microscope (SEM). Then, a unit lattice Uc is randomly selected from the photographed SEM picture and the arrangement pitch P1 of the unit lattice Uc and the track pitch Tp are measured (see FIG. 24B). The area S of one bottom surface of four structures 3 included in the unit lattice Uc is measured by image processing. Then, the filling rate is calculated by Expression 2 using the arrangement pitch P1, the track pitch Tp, and the area S of the bottom surface.

$$\text{Filling rate} = (S(\text{tetra})/S(\text{unit})) \times 100 \qquad \text{Expression 2}$$

Here, the area of the unit lattice is $S(\text{unit}) = 2 \times (P1 \times Tp) \times (1/2)) = P1 \times Tp$ and the area of the bottom surface of the structure located in the unit lattice is $S(\text{tetra}) = S$.

The above-mentioned filling rate calculating process is performed 10 unit lattices randomly selected from the SEM picture. The measured values are simply averaged (arithmetic average) to obtain the average of the filling rate and this is set as the filling rate of the structures 3 on the surface of the base member.

The ratio $((2r/P1) \times 100)$ of the diameter 2r to the arrangement pitch P1 is 127% or more, preferably 137% or more, and more preferably 146% or more. By setting this range, it is possible to enhance the filling rate of the structures 3 and to improve the antireflection characteristic. Here, the arrangement pitch P1 means the arrangement pitch of the structures 3 in the track direction and the diameter 2r is the diameter of the bottom surfaces of the structures in the track direction. When the bottom surfaces of the structures are circular, the diameter 2r is the diameter of the circle. When the bottom surfaces of the structures are elliptical, the diameter 2r is the long-axis diameter of the ellipse.

Figure 15A:
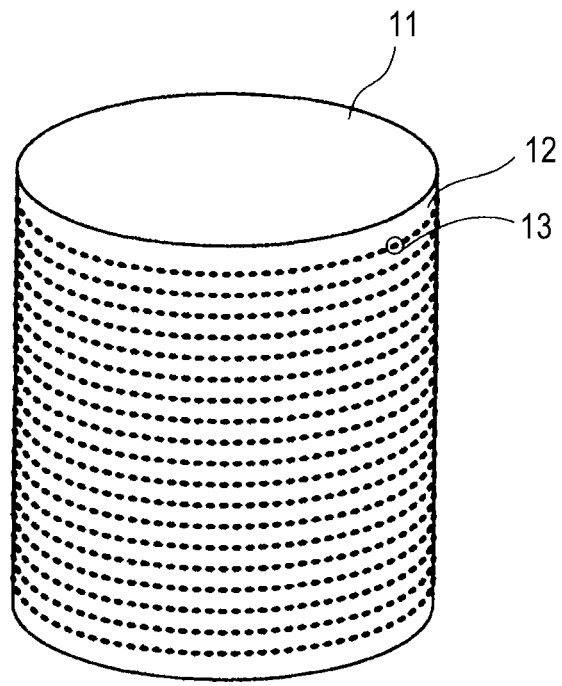
FIG. 15A is a perspective view illustrating a configuration of a roll master used to manufacture an optical device and FIG. 15B is a plan view illustrating the configuration of the roll master used to manufacture an optical device.
Figure 15B:
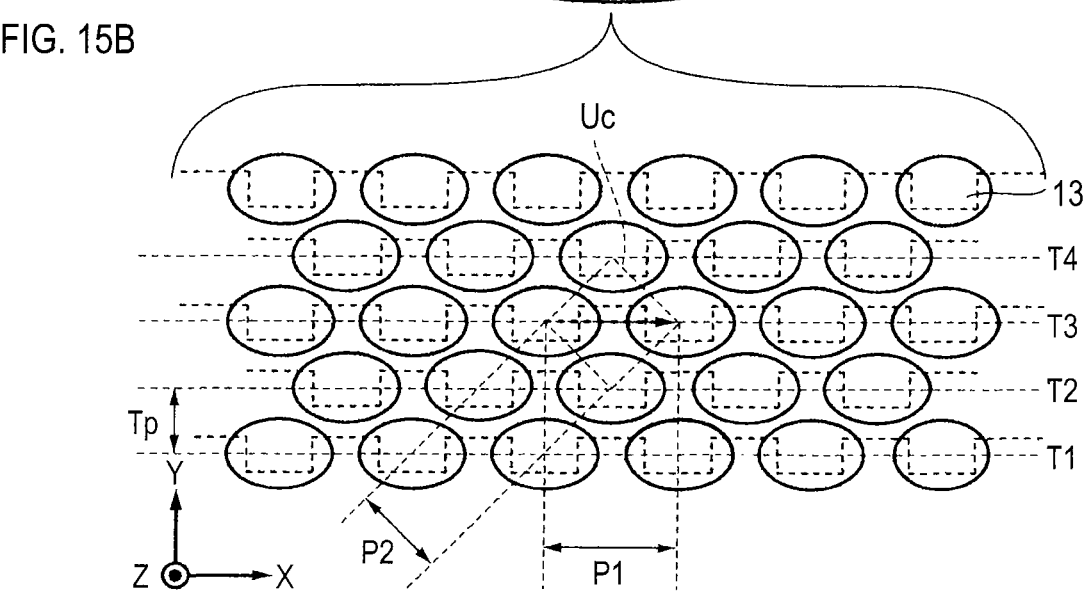

FIG. 15 is a diagram illustrating a configuration of a roll master used to manufacture an optical device having the above-mentioned configuration. This roll master is different from that according to the first embodiment, in that the concave structures 13 on the surface form tetragonal lattice patterns or quasi-tetragonal lattice patterns.

Two-dimensional patterns are spatially linked with a roll master exposure device, a signal is generated by synchronizing a rotation controller of a recording apparatus with a polarity inverting formatter signal for each track, and the master is patterned with a proper transfer pitch by the use of a CAV. Accordingly, it is possible to record a tetragonal lattice pattern or quasi-tetragonal lattice pattern. By properly setting the frequency of the polarity inverting formatter signal and the number of revolutions of a roll, it is preferable that lattice patterns with a constant spatial frequency are formed in a resist layer on the master 12 by applying the laser beam to a desired recording area.

3. Third Embodiment

Figure 16:
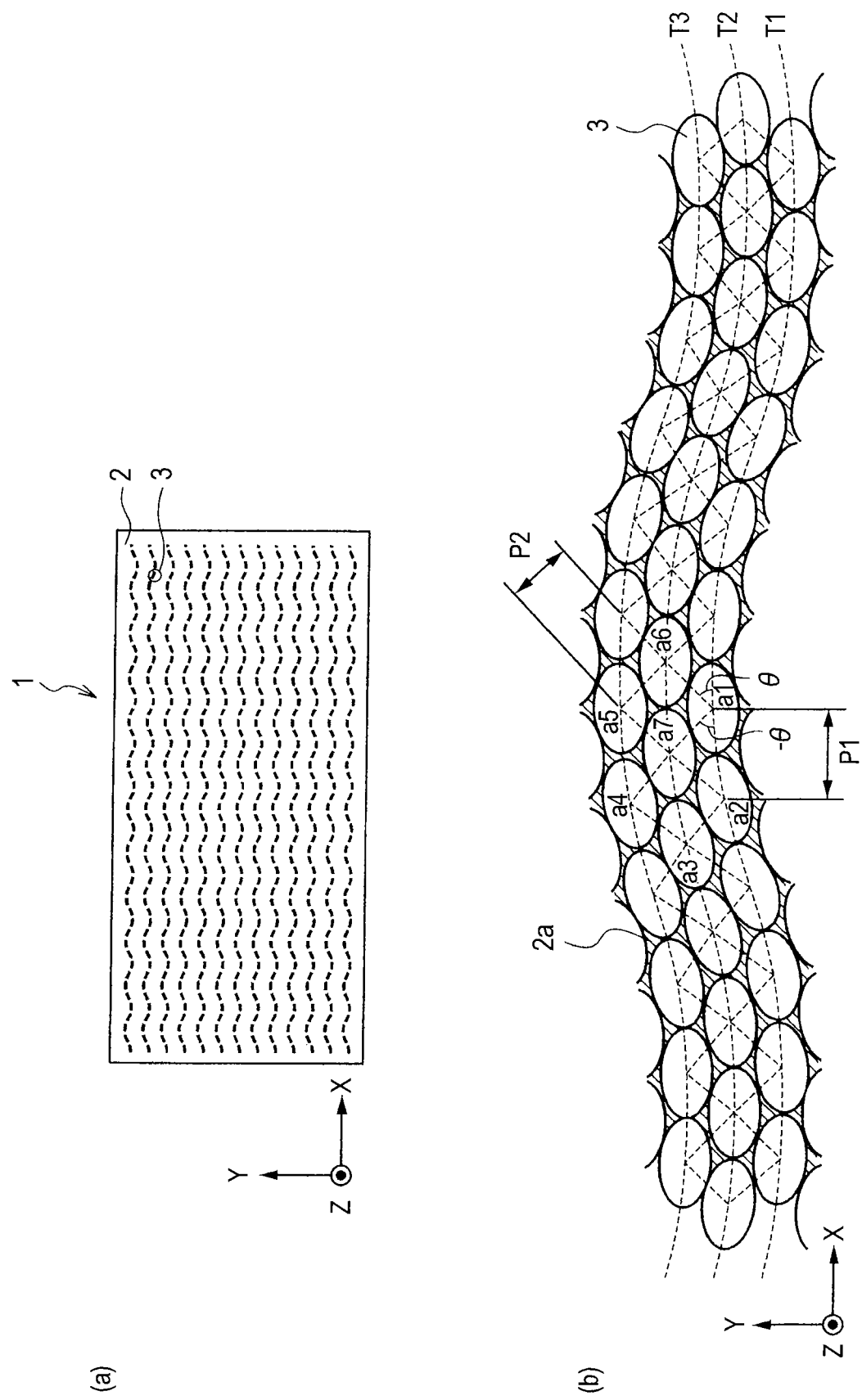
FIG. 16A is a plan view schematically illustrating a configuration of an optical device according to a third embodiment and FIG. 16B is a partially-enlarged plan view illustrating the optical device shown in FIG. 16A.

FIG. 16A is a plan view schematically illustrating a configuration of an optical device according to a third embodiment. FIG. 16B is a partially-enlarged plan view illustrating the optical device shown in FIG. 16A.

The optical device 1 according to the third embodiment is different from the first embodiment, in that the structures 3 are arranged on meandering tracks (hereinafter, referred to as "wobble track"). It is preferable that the wobble tracks on the base member 2 are synchronized. That is, it is preferable that the wobbles are synchronized wobbles. By synchronizing the wobbles, it is possible to maintain the shape of the unit lattice of the hexagonal lattices or quasi-hexagonal lattices and to keep the filling rate high. Examples of the waveform of the wobble tracks can include sinusoidal waves and triangular waves. The waveform of the wobble tracks is not limited to periodic waveforms, but may be non-periodic waveforms. The wobble amplitude of the wobble tracks is selected to be, for example, about ±10 μm.

The third embodiment is similar to the first embodiment, except for the above-mentioned factors.

According to the third embodiment, since the structures 3 are arranged in the wobble tracks, it is possible to suppress irregular appearance.

4. Fourth Embodiment

Figure 17A:
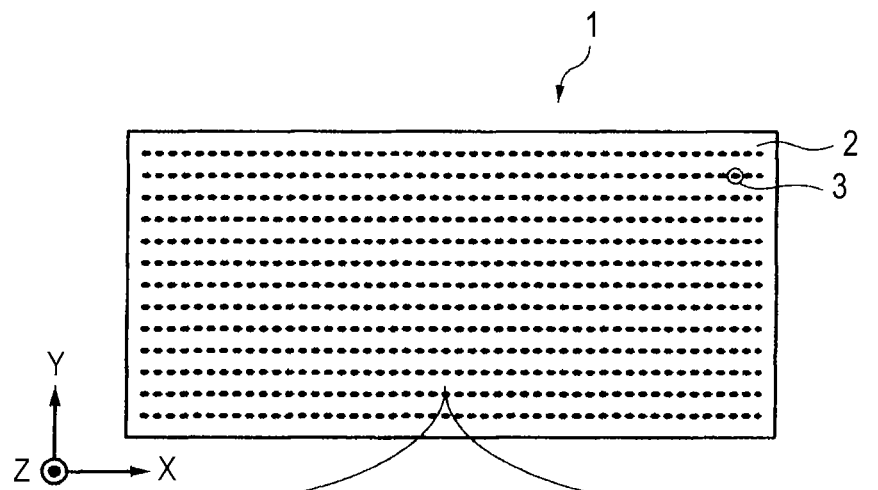
FIG. 17A is a plan view schematically illustrating a configuration of an optical device according to a fourth embodiment.
Figure 17B:
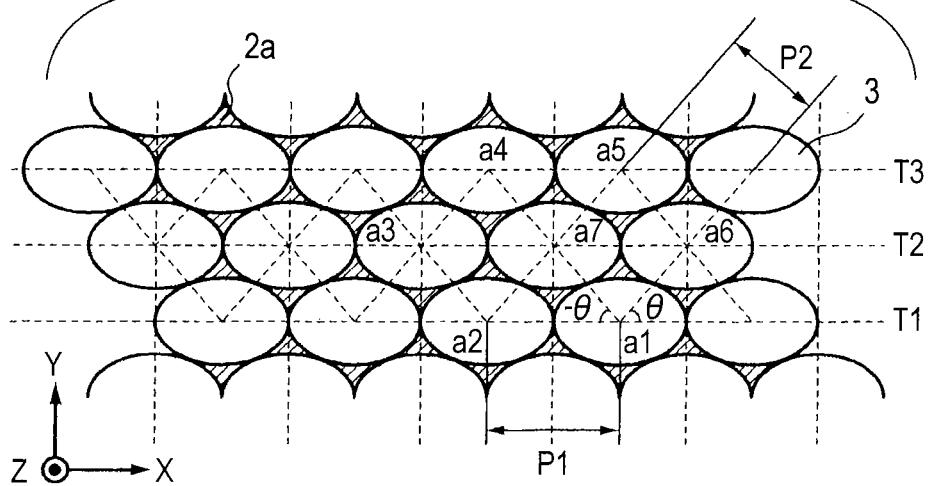
FIG. 17B is a partially-enlarged plan view illustrating the optical device shown in FIG. 17A.
Figure 17C:
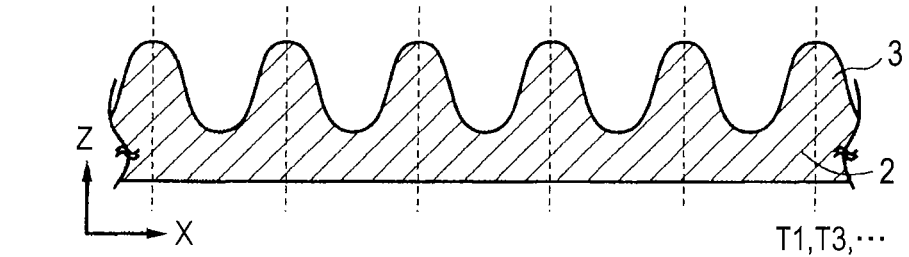
FIG. 17C is a sectional view of tracks T1, T3, ... shown in FIG. 17B.
Figure 17D:
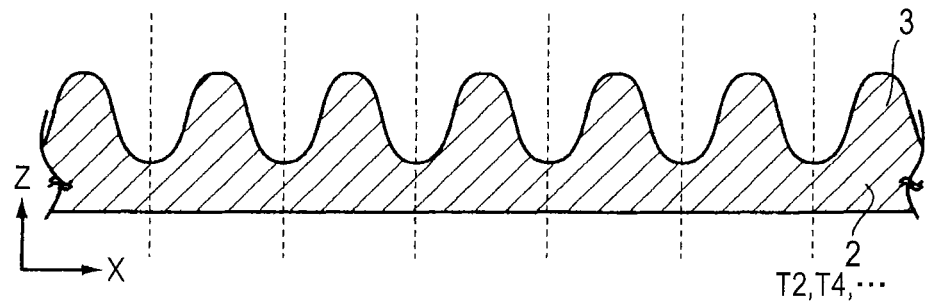
FIG. 17D is a sectional view of tracks T2, T4, ... shown in FIG. 17B.
Figure 18:
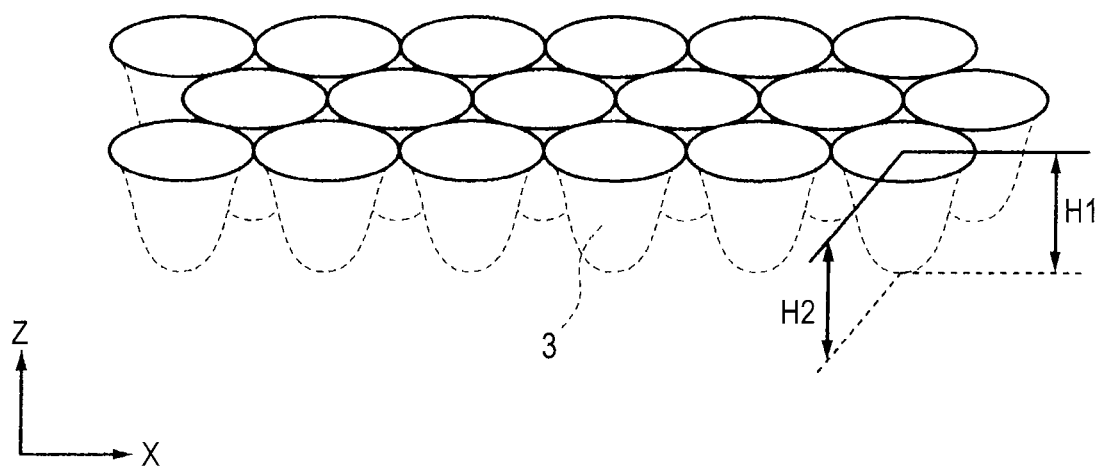
FIG. 18 is a partially-enlarged perspective view illustrating the optical device shown in FIG. 17.

FIG. 17A is a plan view schematically illustrating a configuration of an optical device according to a fourth embodiment. FIG. 17B is a partially-enlarged plan view illustrating the optical device shown in FIG. 17A. FIG. 17C is a sectional view of tracks T1, T3, . . . shown in FIG. 17B. FIG. 17D is a sectional view of tracks T2, T4, . . . shown in FIG. 17B. FIG. 18 is a partially-enlarged perspective view illustrating the optical device shown in FIG. 17.

The optical device 1 according to the fourth embodiment is different from that according to the first embodiment, in that plural concave structures 3 are arranged on the surface of the base member. The shape of the structures 3 is concave unlike the convex shape of the structures 3 in the first embodiment. When the structures 3 are concave as described above, the opening (entrance of the concave portion) of each concave structure 3 is defined as a bottom and the lowest portion (the deepest portion of the concave portion) in the depth direction of the base member 2 is defined as a vertex. That is, the vertex and the bottom are defined by the structure 3 which is an immaterial space. In the fourth embodiment, since the structures 3 are concave, the height H of the structures 3 in Expression 1 and the like is replaced with the depth H of the structures 3.

The fourth embodiment is similar to the first embodiment, except for the above-mentioned factors.

In the fourth embodiment, since the shape of the convex structures 3 in the first embodiment is inverted to a concave shape, it is possible to obtain the same advantages as the first embodiment.

5. Fifth Embodiment

Configuration of Liquid Crystal Display.

Figure 19:
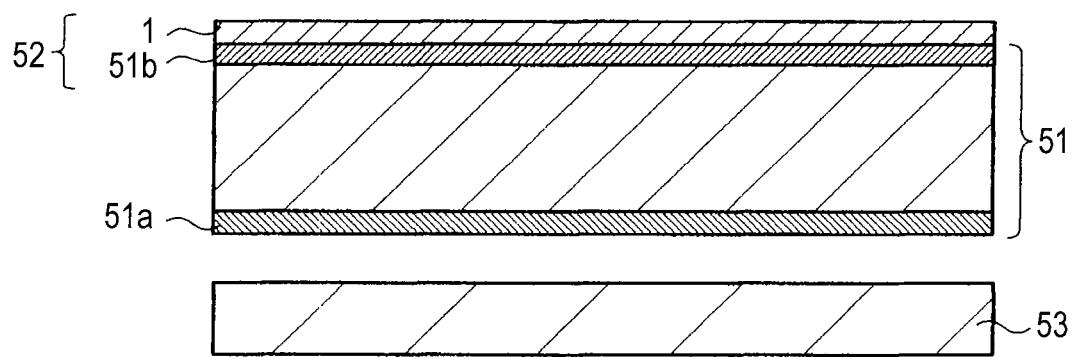
FIG. 19 is a diagram illustrating a configuration of a liquid crystal display according to a fifth embodiment.

FIG. 19 is a diagram illustrating a configuration of a liquid crystal display according to a fifth embodiment. As shown in FIG. 19, the liquid crystal display includes a backlight 53 emitting light and a liquid crystal panel 51 temporally and spatially modulating the light emitted from the backlight 53 to display an image. Both surfaces of the liquid crystal panel 51 are provided with polarizers 51a and 51b which are optical components. The polarizer 51b disposed on a display surface side of the liquid crystal panel 51 is provided with an optical device 1. Here, the polarizer 51b having the optical device 1 disposed on one main surface thereof is referred to as "antireflection function polarizer 52." The antireflection function polarizer 52 is an example of an antireflection function optical component.

The backlight 53, the liquid crystal panel 51, the polarizers 51a and 51b, and the optical device 1 constituting the liquid crystal display will be sequentially described now.

Backlight

For example, a direct backlight, an edge backlight, or a flat surface light source backlight can be used as the backlight 53. The backlight 53 includes, for example, a light source, a reflecting plate, and an optical film. For example, a cold cathode fluorescent lamp (CCFL), a hot cathode fluorescent lamp (HCFL), an organic electroluminescence (OEL) device, an inorganic electroluminescence (IEL) device, or a light emitting diode (LED) are used as the light source.

Liquid Crystal Panel

For example, a liquid crystal panel having a display mode such as a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, and a phase change guest host (PCGH) mode can be used as the liquid crystal panel 51.

Polarizer

Both surfaces of the liquid crystal panel 51 are provided with polarizers 51a and 51b, for example, so that the transmission axes thereof are perpendicular to each other. The polarizers 51a and 51b transmit one of the perpendicular polarization components out of the incident light and block the other by absorption. For example, films obtained by allowing hydrophilic polymer films such as polyvinyl alcohol films, partially-formalated polyvinyl alcohol films and partially-saponified ethylene/vinyl acetate copolymer-based films, to adsorb dichroic material such as iodine or dichroic dye and then uniaxially stretching the resulting films, can be used as the polarizers 51a and 51b. It is preferable that a protective layer such as a triacetyl cellulose (TAC) film is provided to both surfaces of the polarizers 51a and 51b. When the protective layer is provided in this way, it is preferable that the base member 2 of the optical device 1 is also used as the protective layer. By this configuration, it is possible to reduce the thickness of the antireflection function polarizer 52.

Optical Device

The optical device 1 is similar to that according to any one of the first to fourth embodiments and thus its description will be omitted.

According to the fifth embodiment, since the optical device 1 is disposed on a display surface of the liquid crystal display, it is possible to improve the antireflection function of the display surface of the liquid crystal display. Therefore, it is possible to improve the visibility of the liquid crystal display.

6. Sixth Embodiment

Configuration of Liquid Crystal Display

Figure 20:
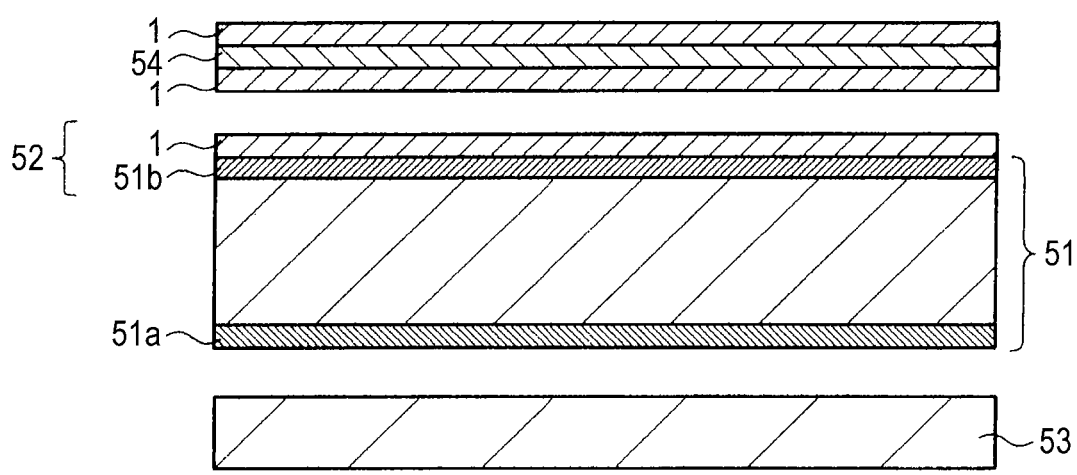
FIG. 20 is a diagram illustrating a configuration of a liquid crystal display according to a sixth embodiment.

FIG. 20 is a diagram illustrating a configuration of a liquid crystal display according to a sixth embodiment. The liquid crystal display is different from that according to the fifth embodiment, in that a front member 54 is disposed on the front side of the liquid crystal panel 51 and an optical device 1 is provided to the front surface of the liquid crystal panel 51 and at least one surface of the front surface and the rear surface of the front member 54. In FIG. 20, the front surface of the liquid crystal panel 51 and both the front surface and the rear surface of the front member 54 are provided with the optical device 1. For example, an air layer is formed between the liquid crystal panel 51 and the front member 54. The same elements as the fifth embodiment are referenced by the same reference numerals and a description thereof is omitted. In the invention, the front surface means a surface serving as a display surface, that is, a surface facing an observer and the rear surface means a surface opposite to the display surface.

The front member 54 is a front panel used in the front side (observer side) of the liquid crystal panel 51 for the purpose of mechanical, thermal, and weather-resistance protection or design quality. The front member 54 has, for example, a sheet shape, a film shape, or a plate shape. For example, glass, triacetyl cellulose (TAC), polyester (TPEE), polyethylene terephthalate (PET), polyimide (PI), polyamide (PA), aramide, polyethylene (PE), poly acrylate, polyether sulfonate, polysulfonate, polypropylene (PP), diacetyl cellulose, polyvinyl chloride, or acryl resin (PMMA), polycarbonate (PC) can be used as the material of the front member 54, but the material of the front member is not limited to these materials. Any material can be used as long as it has transparency.

According to the sixth embodiment, similarly to the fifth embodiment, it is possible to improve the visibility of the liquid crystal display.

EXAMPLES

The embodiments will be described now in detail with reference to examples, but the invention is not limited to the examples.

Example 1

A glass roll master with an outer diameter of 126 mm was first prepared and a resist layer was formed on the surface of the glass master as follows. That is, the resist was formed by diluting a photo resist with a thinner to 1/10 and applying the diluted resist to the peripheral surface of the glass roll master with a thickness of about 130 nm by the use of a dip. Then, by carrying the glass master as a recording medium to the roll master exposure device shown in FIG. 11 and exposing the resist layer, latent images having a single helical line and forming hexagonal lattice patterns in three adjacent tracks were patterned in the resist layer.

Specifically, a laser beam with a power of 0.50 mj/m, for exposing the surface of the glass roll master, was applied to the area in which the hexagonal lattice patterns should be formed to form concave quasi-hexagonal lattice patterns. As shown in FIG. 13A, the thickness of the resist in the track arranging direction was about 120 nm and the thickness of the resist in the track extending direction was about 100 nm.

The resist of the exposed portion was dissolved and developed by performing the developing operation on the resist on the glass roll master. Specifically, the non-developed glass roll master was placed on a turn table of a developing device not shown and the developer was dropped to the surface of the glass roll master while rotating the turn table, thereby developing the resist on the surface thereof. Thereby, a resist glass master having a resist layer with openings in a quasi-hexagonal lattice pattern was obtained.

A plasma etching operation was carried out under a CHF3 gas atmosphere using a roll plasma etching process. Accordingly, on the surface of the glass roll master, only the portions of the quasi-hexagonal lattice patterns exposed from the resist layer were etched and the other areas were not etched due to the photo resist serving as a mask, thereby obtaining elliptical cone-shaped concave portions. At the time of patterning, the amount of etching (depth) was changed with the etching time. Finally, by completely removing the photo resist by an O2 ashing, a moth-eye glass roll master with concave hexagonal lattice patterns was obtained. The depth of the concave portions in the arranging direction was greater than the depth of the concave portions in the track extending direction.

An optical device (FIG. 13C) was manufactured by bringing UV-curable resin into close contact with the moth-eye glass roll master with an applied acryl sheet interposed therebetween, which it was then peeled off while curing the transfer material by applying UV thereto.

Example 2

By patterning the resist layer while adjusting the frequency of the polarity inverting formatter signal, the number of revolutions of the roll, and an appropriate transfer pitch for each track, quasi-hexagonal lattice patterns were recorded on the resist layer. By setting the other conditions to the same as Example 1, an optical device was manufactured.

Example 3

By patterning the resist layer while adjusting the frequency of the polarity inverting formatter signal, the number of revolutions of the roll, and an appropriate transfer pitch for each track, tetragonal lattice patterns were recorded on the resist layer. By setting the other conditions to the same as Example 1, an optical device was manufactured.

Example 4

By patterning the resist layer while adjusting the frequency of the polarity inverting formatter signal, the number of revolutions of the roll, and an appropriate transfer pitch for each track, quasi-tetragonal lattice patterns were recorded on the resist layer. By setting the other conditions to the same as Example 1, an optical device was manufactured.

Evaluation of Shape

The optical devices according to Examples 1 to 4 as described above were observed by the use of an atomic force microscope (AFM). The heights of the structures according to the above-mentioned examples were measured from the sectional profiles of the AFM. The results are shown in Table 2 and Table 3.

TABLE 2

|  | Example 1 | Example 2 |
| --- | --- | --- |
| Lattice Pattern | Hexagonal Lattice | Quasi-Hexagonal Lattice |
| Height in Track Extending Direction | 243 nm | 308 nm |
| Height in Arranging Direction | 301 nm | 348 nm |
| Period in Track Extending Direction (P1) | 300 nm | 315 nm |
| Period in Direction of 60 degree (P2) | 300 nm | 300 nm |
| Average Period | 300 nm | 305 nm |
| Aspect Ratio | 1 | 1.14 |

TABLE 3

|  | Example 3 | Example 4 |
| --- | --- | --- |
| Lattice Pattern | Tetragonal lattice | Quasi-tetragonal lattice |
| Height in Direction Oblique by (about) 45 degree with respect to Track Extending Direction | 248 nm | 202 nm |
| Height in Arranging Direction | 275 nm | 226 nm |
| Period in Track Extending Direction (P1) | 360 nm | 360 nm |
| Track Period | 180 nm | 160 nm |

TABLE 3-continued

|  | Example 3 | Example 4 |
|---|---|---|
| Period (P2) | 255 nm | 241 nm |
| Aspect Ratio | 1.08 | 0.94 |

The moth-eye shape of the optical devices according to Examples 1 and 2 was a convex truncated elliptical cone shape (elliptical cone shape) in a hexagonal lattice or a quasi-hexagonal lattice. It could be known from the AFM sectional profile that the height of the structures in the track extending direction is smaller than the height of the structures in the track arranging direction. Since the heights of the structures in the directions other than the track extending direction are substantially equal to the height of the structures in the track arranging direction, the heights of the structures are represented by the height in the track arranging direction.

The moth-eye shape of the optical devices according to Examples 3 and 4 is a convex truncated elliptical cone shape (elliptical cone shape) in a tetragonal lattice or a quasi-tetragonal lattice. It could be known from the AFM sectional profile that the height of the structures in the direction oblique by 45 degree with respect to the track extending direction is smaller than the height of the structures in the track arranging direction. Since the heights of the structures in the directions other than the direction oblique by 45 degree with respect to the track extending direction are substantially equal to the height of the structures in the track arranging direction, the heights of the structures are represented by the height in the track arranging direction.

Evaluation of Reflectance and Transmittance

Figure 21:
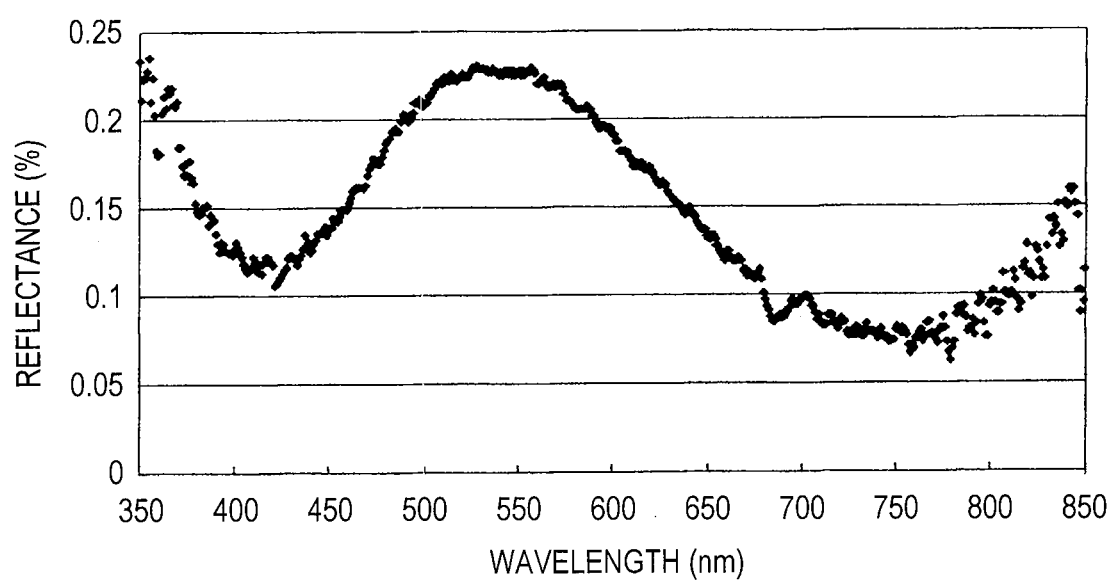
FIG. 21 is a graph illustrating the wavelength dependence of a reflectance in an optical device according to Example 1.
Figure 22:
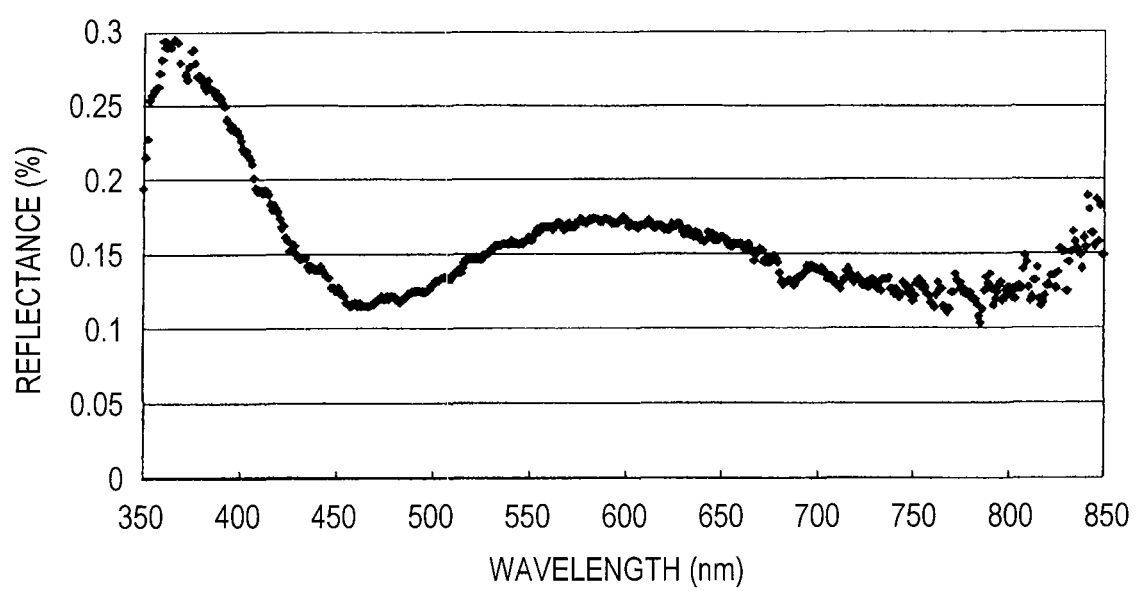
FIG. 22 is a graph illustrating the wavelength dependence of a reflectance in an optical device according to Example 2.
Figure 23:
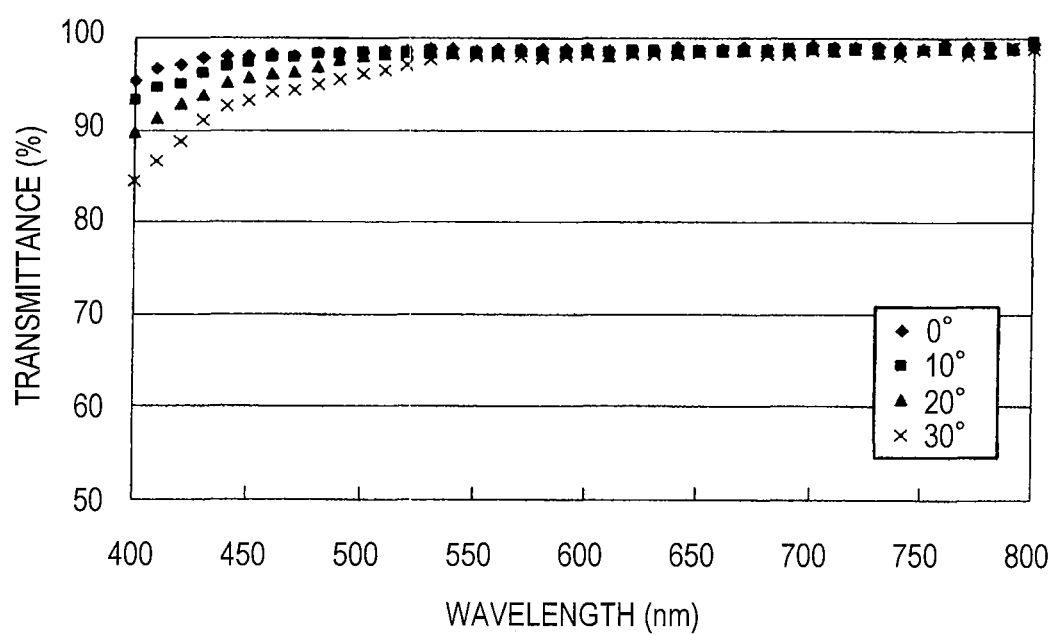
FIG. 23 is a graph illustrating the wavelength dependence of a transmittance in an optical device according to Example 3.
Figure 24:
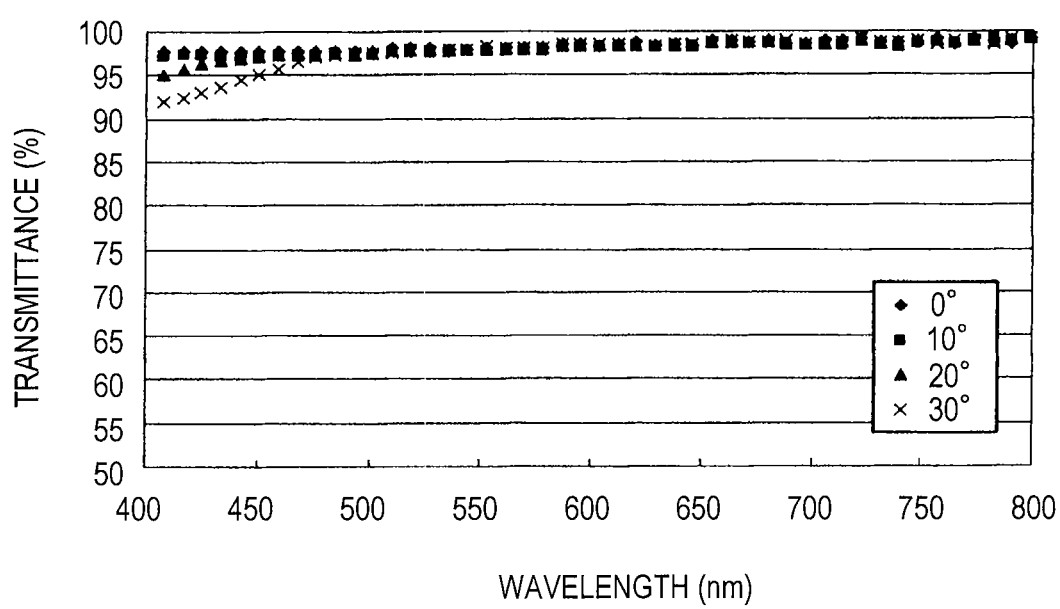
FIG. 24 is a graph illustrating the wavelength dependence of a transmittance in an optical device according to Example 4.

The reflectance and the transmittance of the optical devices according to Examples 1 to 4 were evaluated using an evaluation device (V-550) made by Jasco Corporation. The wavelength dependences of the reflectance in the optical devices according to Example 1 and Example 2 are shown in FIGS. 21 and 22, respectively. The wavelength dependences of the transmittance in the optical devices according to Example 3 and Example 4 are shown in FIGS. 23 and 24, respectively.

In the optical devices according to Examples 1 and 2, the wavelength dependence of the reflectance exists, the reflectance of the substrate without the moth-eye pattern is 4.5% and the average reflectance is 0.15% in the range from the UV light to the visible light (wavelength range of 350 nm to 800 nm), which is sufficiently small. It could be confirmed that the satisfactory antireflection effect is obtained in the optical device in which the height of the structures is small in the track extending direction.

In Examples 3 and 4, the transmittance is 98% to 99% in the visible light range (wavelength range of 400 nm to 800 nm), which provides a satisfactory transmission characteristic. Up to an incidence angle of 30 degree, the transmittance is 99% in the RGB light of wavelengths 650 nm, 540 nm, and 460 nm, which provides satisfactory angle dependence. It could be confirmed that the satisfactory transmission effect is obtained in the optical device in which the height of the structures is small in the direction oblique by 45 degree with respect to the track extending direction.

The moth-eye shape of the optical device was a convex truncated elliptical cone shape (elliptical cone shape) of a hexagonal lattice, a quasi-hexagonal lattice, a tetragonal lattice, or a quasi-tetragonal lattice as described above and the satisfactory antireflection characteristic could be obtained in the optical device with an aspect ratio of 0.94 to 1.14. The concave elliptical cone-shaped grooves could be confirmed in the moth-eye glass master.

Example 5

First, similarly to Example 2, a moth-eye glass master was prepared. Then, by applying UV-curable resin onto the moth-eye glass master, bringing an acryl sheet (with a thickness of 0.20 mm) into close contact with the UV-curable resin, and peeling the acryl sheet while applying UV light and hardening the UV-curable resin, a moth-eye UV-cured replicated sheet was obtained.

Then, the rear surface of the moth-eye UV-cured replicated sheet was brought into close contact with the convex surface of a Φ25 mm plane-convex lens (with a focal length of 70 mm). Thereafter, the moth-eye UV-cured replicated sheet was bent in a convex lens shape in a hot-water bath of 80° C. with a lens holder while bringing the plane-convex lens into close contact with the moth-eye UV-curable replicated sheet. Then, the resultant was placed in the hot-water bath for several minutes and was taken out of the hot-water bath and the lens holder was detached thereto, thereby obtaining the moth-eye UV-cured replicated sheet bent in a convex lens shape.

A conductive film formed of a nickel coating was formed on the concave-convex pattern of the moth-eye UV-cured replicated sheet bent in a convex lens shape by an electroless plating method. The optical disk master having the conductive film formed thereon was set into an electrocasting device and a nickel-plated layer with a thickness of about 300±5 µm was formed on the conductive film by an electrolysis plating method. The nickel-plated layer was peeled off from the moth-eye UV-cured replicated sheet with a cutter, or the like, and the photo resist on the signal forming surface of the nickel-plated layer was cleaned using acetone, or the like, thereby manufacturing a moth-eye Ni metal master bent in a convex lens shape.

A moth-eye replicated substrate bent in a convex lens shape was manufactured as follows. The moth-eye Ni metal master bent in the convex lens shape was placed in a mold and the substrate was molded by an injection molding method using transparent resin of poly carbonate (with a refractive index of 1.59). Accordingly, the substantially hexagonal lattice patterns formed on the signal forming surface were transferred to the transparent resin, whereby the moth-eye replicated substrate bent in the convex lens shape was obtained.

Evaluation of Reflectance and Transmittance

Figure 25:
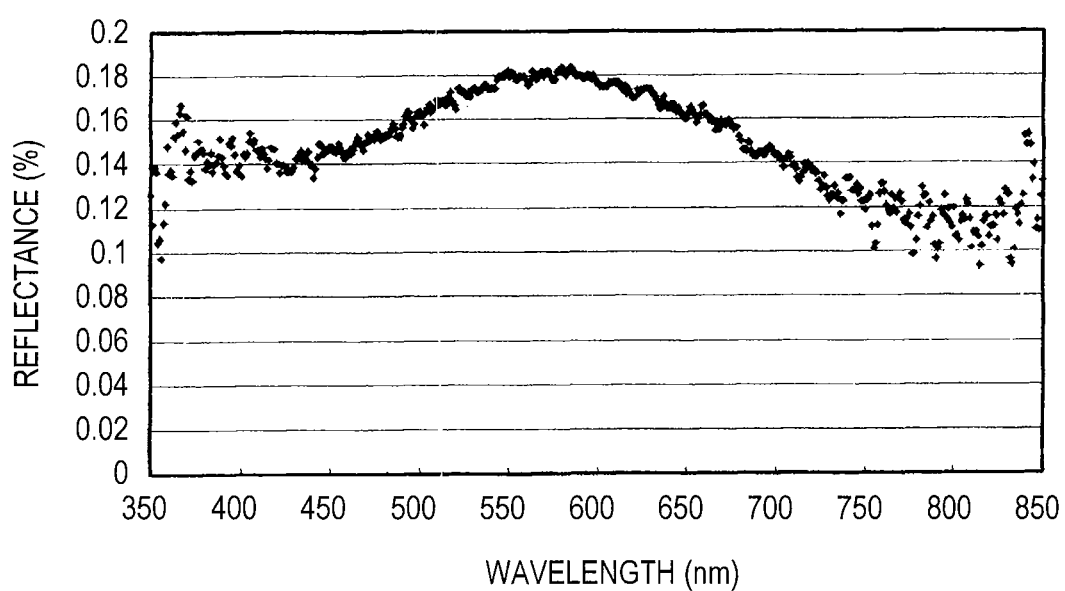
FIG. 25 is a graph illustrating the wavelength dependence of reflectance in an optical device according to Example 5.

The reflectance of the optical device according to Example 5 was evaluated using the evaluation device (V-550) made by Jasco Corporation. The wavelength dependence of the reflectance in the optical device according to Example 5 is shown in FIG. 25.

Example 6

By patterning the resist layer while adjusting the frequency of the polarity inverting formatter signal, the number of revolutions of the roll, and an appropriate transfer pitch for each track, quasi-hexagonal lattice patterns were recorded on the resist layer. By setting the other conditions to the same as Example 1, an optical device was manufactured.

Example 7

By patterning the resist layer while adjusting the frequency of the polarity inverting formatter signal, the number of revolutions of the roll, and an appropriate transfer pitch for each track, tetragonal lattice patterns were recorded on the resist layer. By setting the other conditions to the same as Example 1, an optical device was manufactured.

Example 8

By patterning the resist layer while adjusting the frequency of the polarity inverting formatter signal, the number of revolutions of the roll, and an appropriate transfer pitch for each track, tetragonal lattice patterns were recorded on the resist layer. By setting the other conditions to the same as Example 1, an optical device was manufactured.

Evaluation of Shape

The top views of the optical devices according to Examples 6 to 8 manufactured as described above were observed by the use of a scanning electron microscope (SEM). The results are shown in Table 4.

TABLE 4

|  | Example 6 | Example 7 | Example 8 |
|---|---|---|---|
| SEM Image | FIG. 36 | FIG. 37 | FIG. 38 |
| Lattice Pattern | Quasi-Hexagonal Lattice | Tetragonal lattice | Tetragonal lattice |
| Shape of Bottom Surface of Structure | Ellipse | Ellipse | Ellipse |
| Height H2 in Arranging Direction | 317 nm | 218 nm | 279 nm |
| Arrangement Pitch P1 | 315 nm | 280 nm | 300 nm |
| Track Pitch | 250 nm | 140 nm | 150 nm |
| Arrangement Pitch P2 | 296 nm | 198.0 nm | 212.1 nm |

Figure 26:
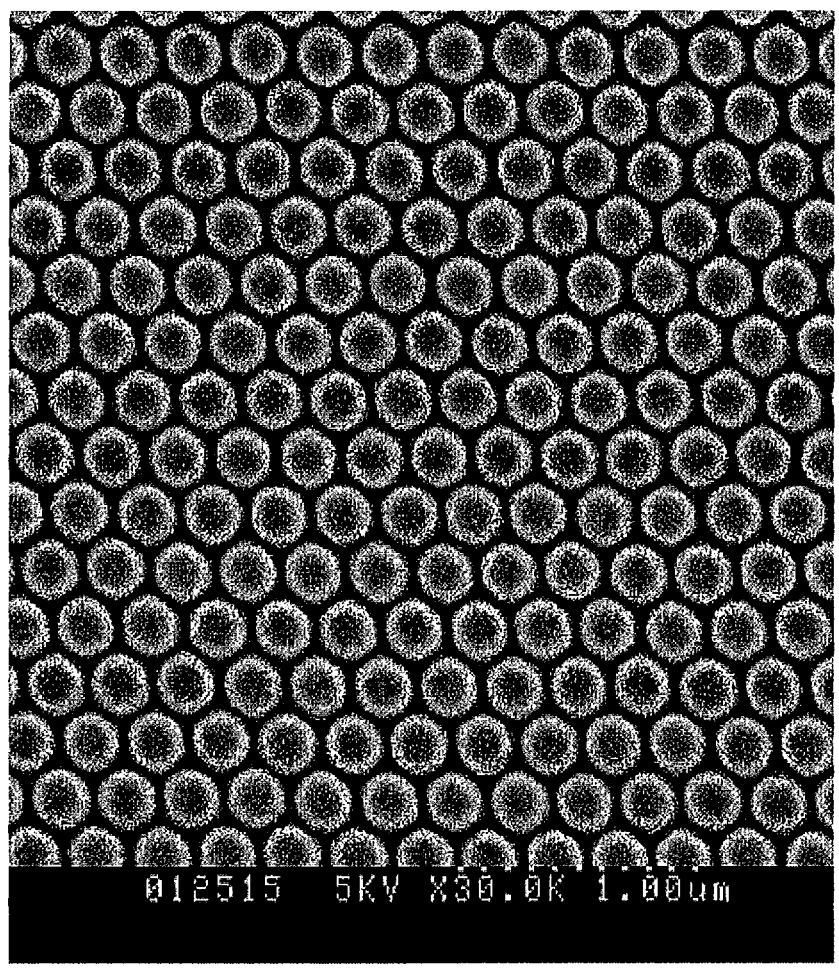
FIG. 26 is a SEM picture illustrating a top view of an optical device according to Example 6.

It can be seen from FIG. 26 that the structures are arranged in a quasi-hexagonal lattice shape in Example 6. It can be seen that the shape of the bottom surface of the structures is elliptical.

Figure 27:
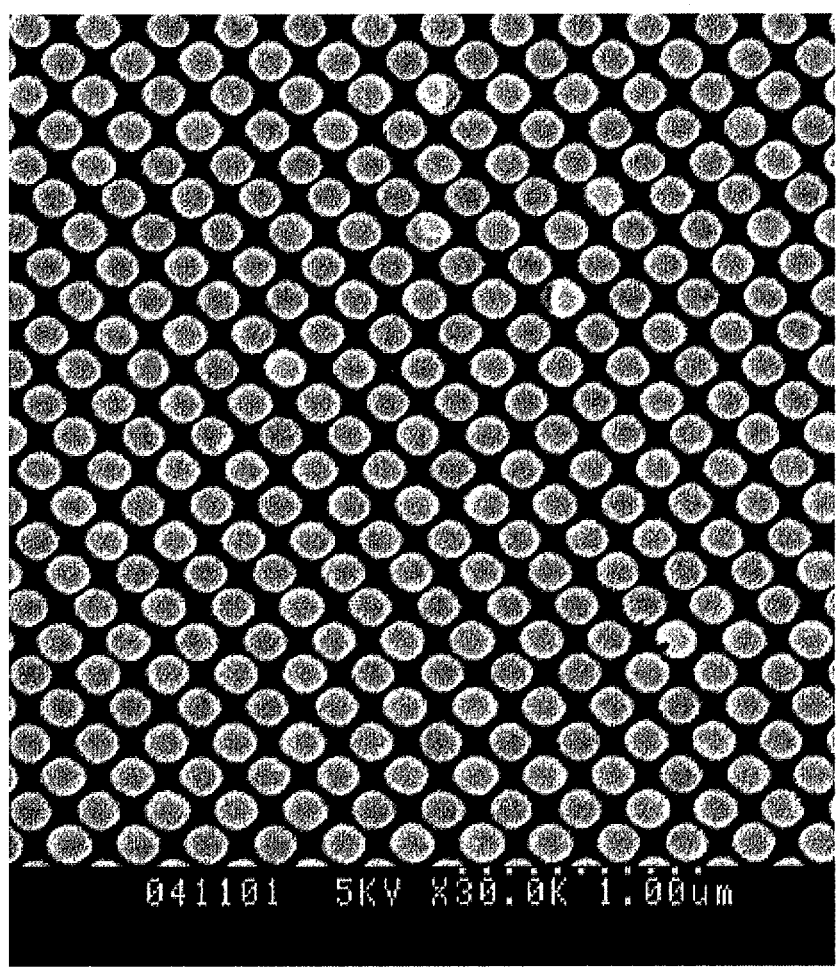
FIG. 27 is a SEM picture illustrating a top view of an optical device according to Example 7.
Figure 28:
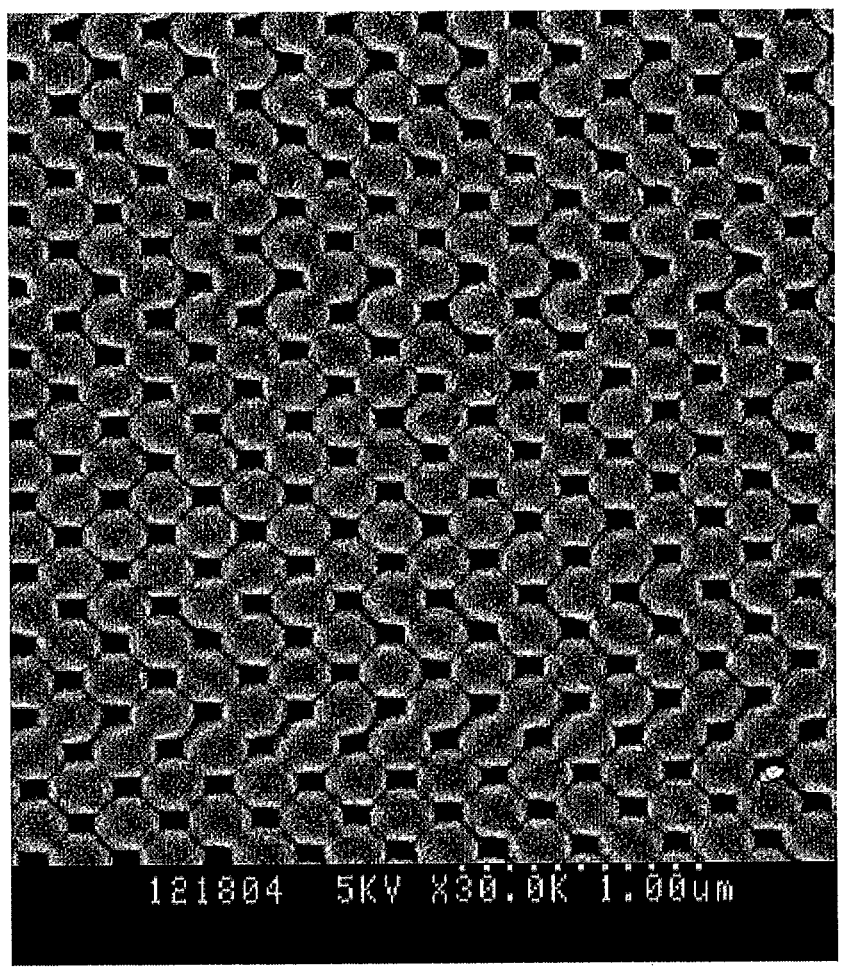
FIG. 28 is a SEM picture illustrating a top view of an optical device according to Example 8.

It can be seen from FIGS. 27 and 28 that the structures are arranged in a tetragonal lattice shape in Examples 7 and 8. It can be also seen that the shapes of the bottom surfaces of the structures are elliptical. It can be seen in Example 8 that the bottoms of the structures are arranged to overlap.

The relation of the height of the structures and the reflectance was studied by RCWA (Rigorous Coupled Wave Analysis) simulation.

Test Example 1

Figure 29:
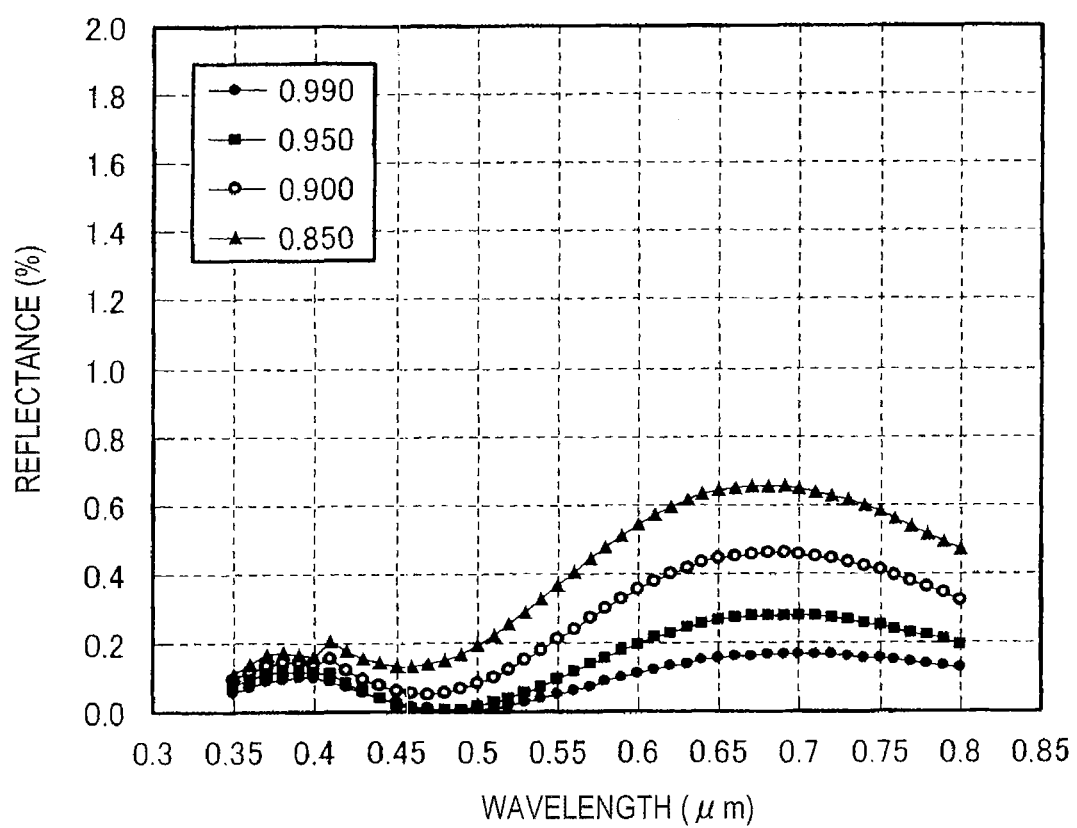
FIG. 29 is a graph illustrating a simulation result of Test Example 1.

The RCWA simulation was carried out while changing the diameter 2r of the bottom surface of the structures to 85%, 90%, 95%, and 99% of the arrangement pitch P1. The result is shown in FIG. 29
    The simulation condition is as follows:
    Shape of structure: hanging bell type;
    Polarization: non-polarized;
    Refractive Index: 1.48;
    Track pitch Tp: 320 nm;
    Height of Structure: 365 nm;
    Aspect Ratio: 1.14; and
    Arrangement of Structures: hexagonal lattice.

It can be seen from FIG. 29 that the reflectance deteriorates when the diameter of the bottom surface of the structures is changed and the filling rate is lowered.

Test Example 2

Similarly to Test Example 1 except that low protruding portions with an aspect ratio of 0.3 are provided between the structures in the track direction, the RCWA simulation was carried out. The result is shown in FIG. 30.

Figure 30:
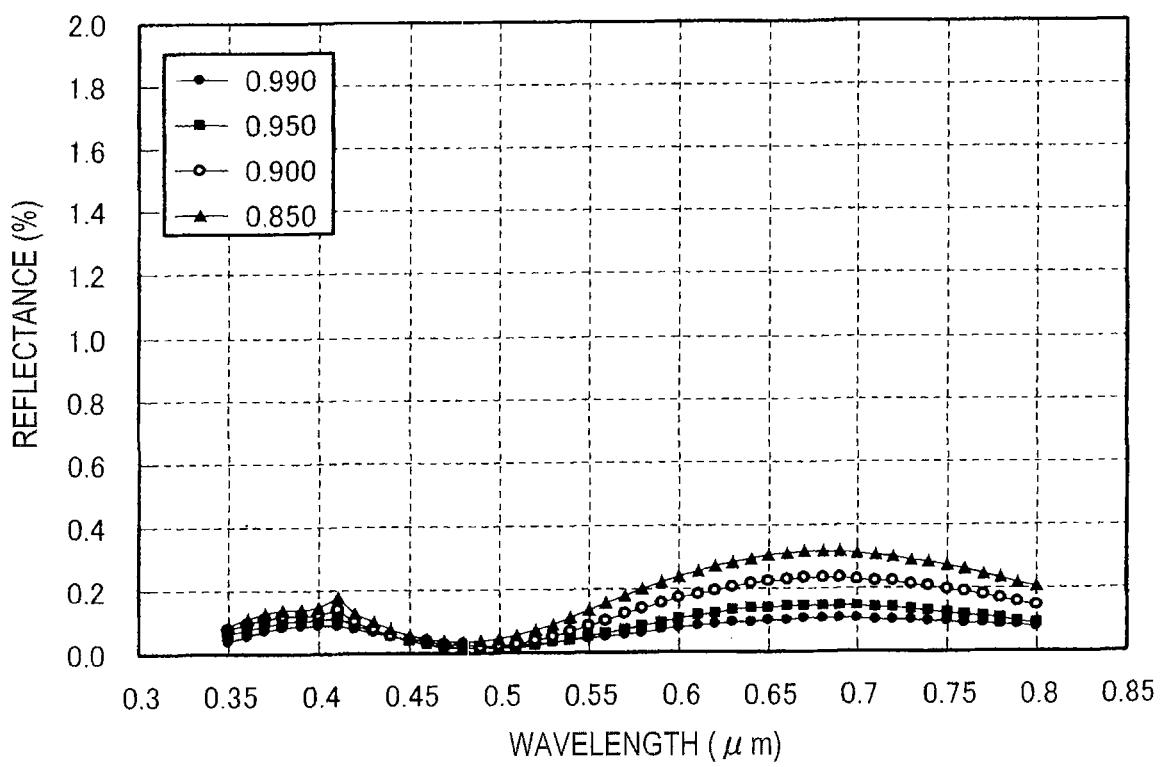
FIG. 30 is a graph illustrating a simulation result of Test Example 2.

It can be seen from FIG. 30 that the reflectance can be suppressed to be low in spite of the lowered filling rate, even when the low protruding portions are disposed between the structures in the track direction.

Test Example 3

Figure 31:
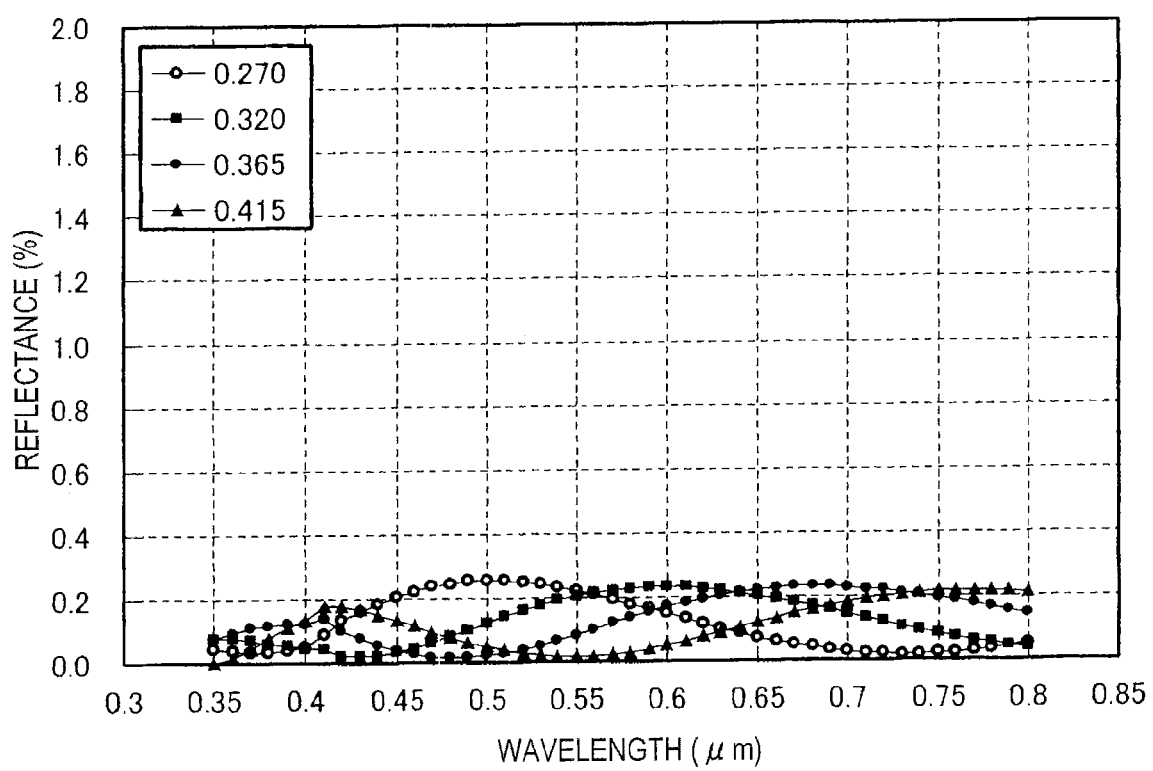
FIG. 31 is a graph illustrating a simulation result of Test Example 3.

Low protruding portions with a height corresponding to ¼ of the height of the structures were provided between the structures in the track direction and then the RCWA simulation was carried out with the following conditions while changing the height of the structures. The result is shown in FIG. 31.
    Shape of structure: hanging bell type
    Polarization: non-polarized
    Refractive Index: 1.48
    Track pitch Tp: 320 nm
    Diameter of Bottom surface of Structure: 90% of track pitch Tp
    Aspect Ratio: 0.93, 1.00, 1.14, and 1.30 (with depths of 0.270, 0.320, 0.385, and 0.415 µm)
    Arrangement of Structures: hexagonal lattice Test Example 4

Figure 32:
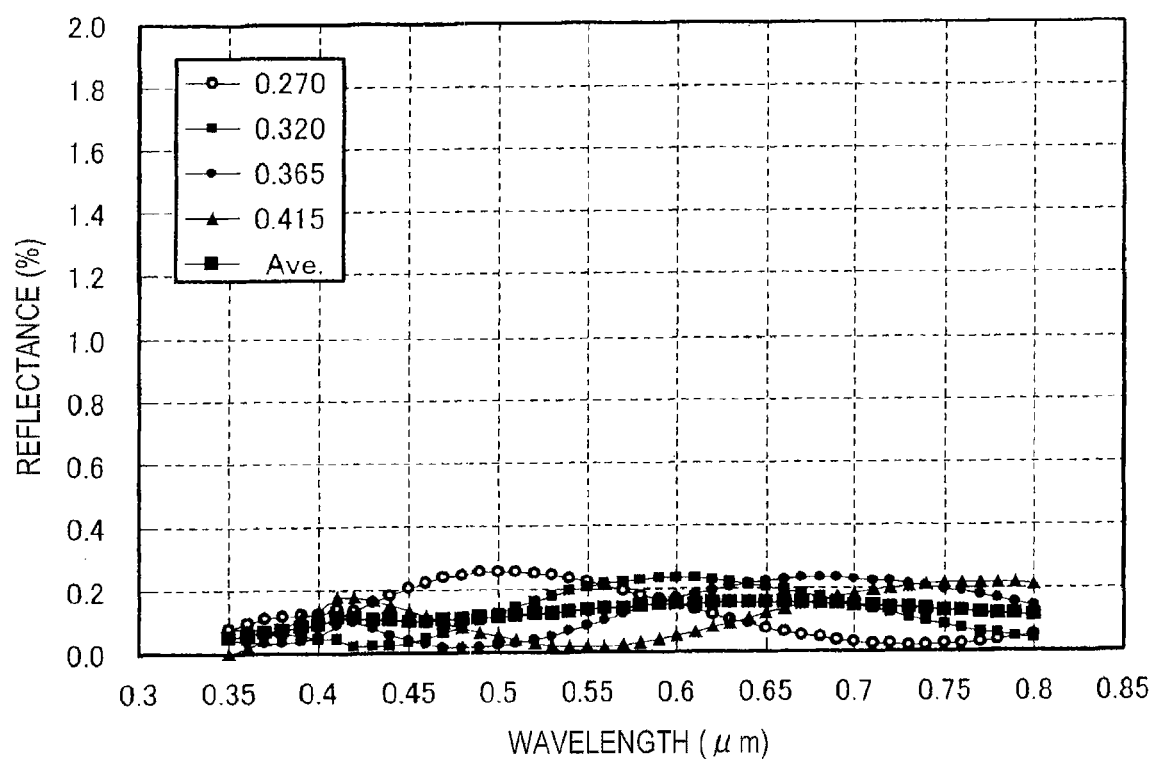
FIG. 32 is a graph illustrating a simulation result of Test Example 4.

In FIG. 32, the result (Ave.) when the structures with the heights in Test Example 3 are made to exist at the same ratio to have a depth distribution is added to the graph of Test Example 3.

It can be seen from FIGS. 31 and 32 that a low reflection characteristic having low wavelength dependence is obtained when low protruding portions are provided between the structures in the track direction and the structures have a height distribution.

Test Example 5

Figure 33:
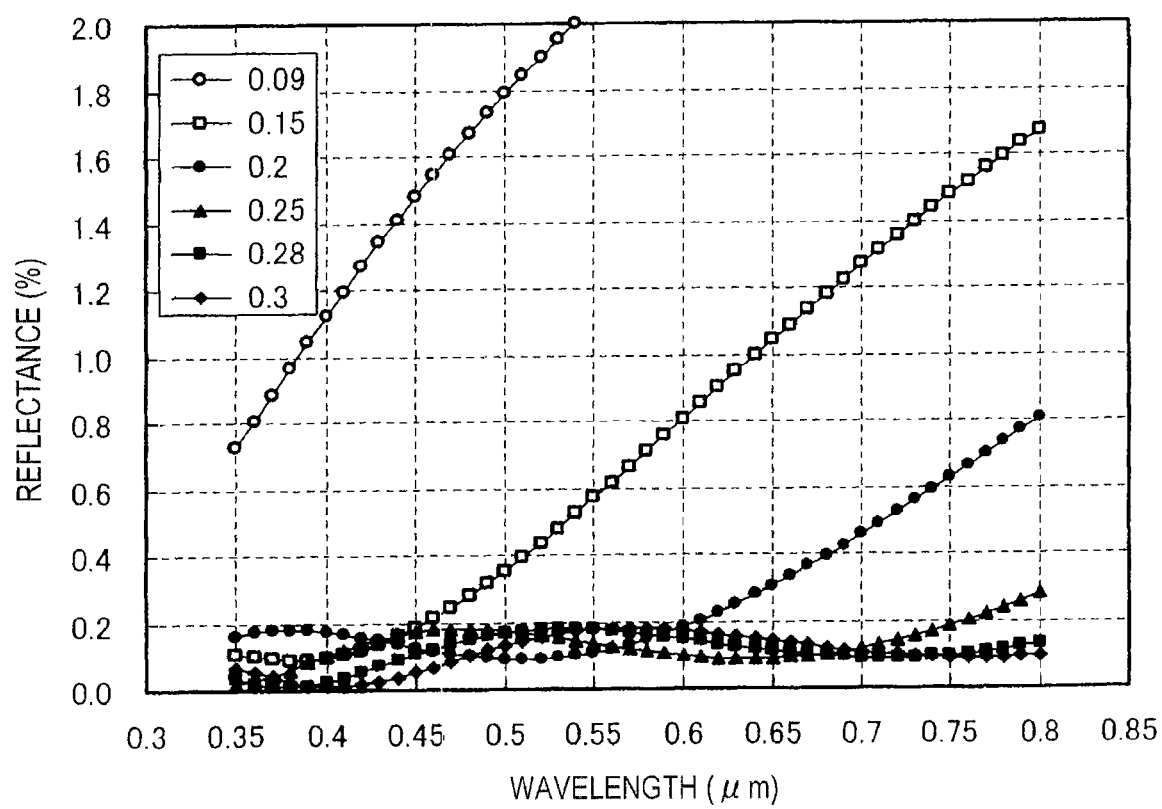
FIG. 33 is a graph illustrating a simulation result of Test Example 5.
Figure 35:
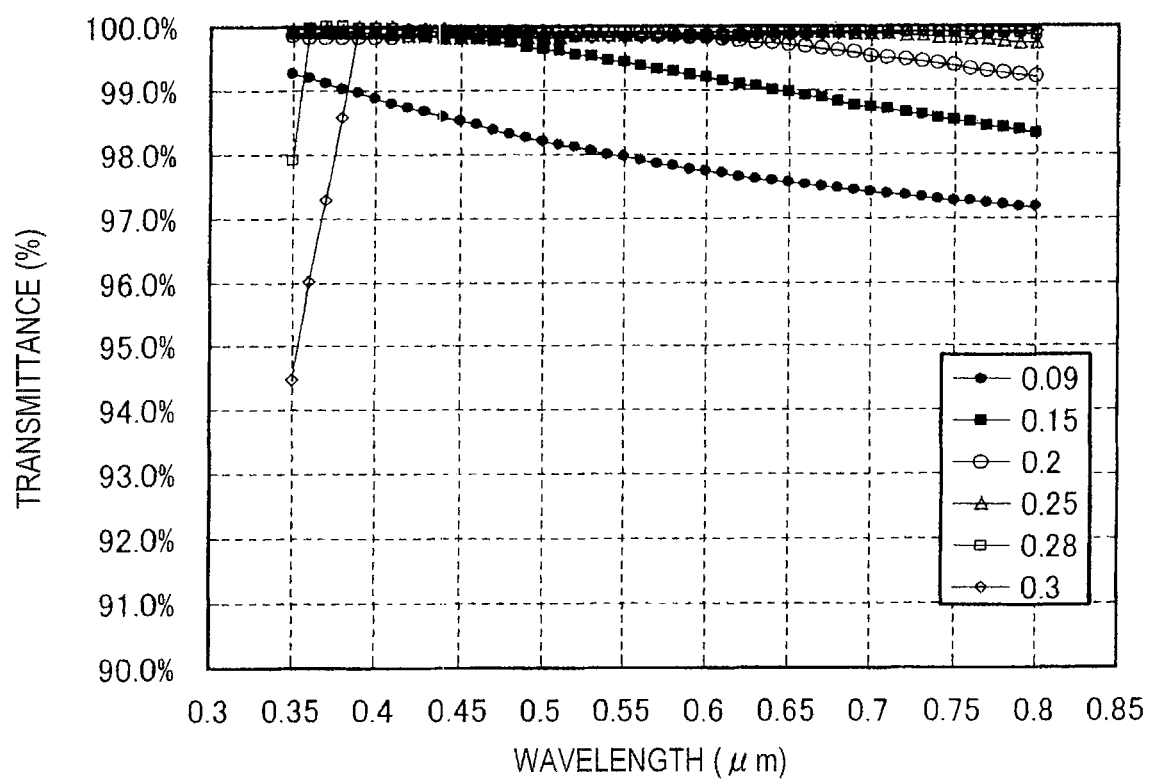
FIG. 35 is a graph illustrating a simulation result of Test Example 5.

The RCWA simulation was carried out with changed track pitches. The result is shown in FIGS. 33 and 35.
    The simulation condition is as follows:
    Shape of structure: hanging bell type;
    Polarization: non-polarized;
    Arranged Lattice: hexagonal lattice;
    Refractive Index: 1.48;
    Track pitch Tp: 0.09 to 0.30 µm;
    Height of Structure: 0.09 to 0.30 µm;
    Aspect Ratio: unified to 1.0; and
    Diameter of Bottom surface of Structure: 99% of track pitch Tp (filling rate: almost maximum).

Test Example 6

Similarly to Test Example 5 except that fine protruding portions are provided around the structures, the RCWA simulation was carried out. The result is shown in FIG. 34.

Figure 34:
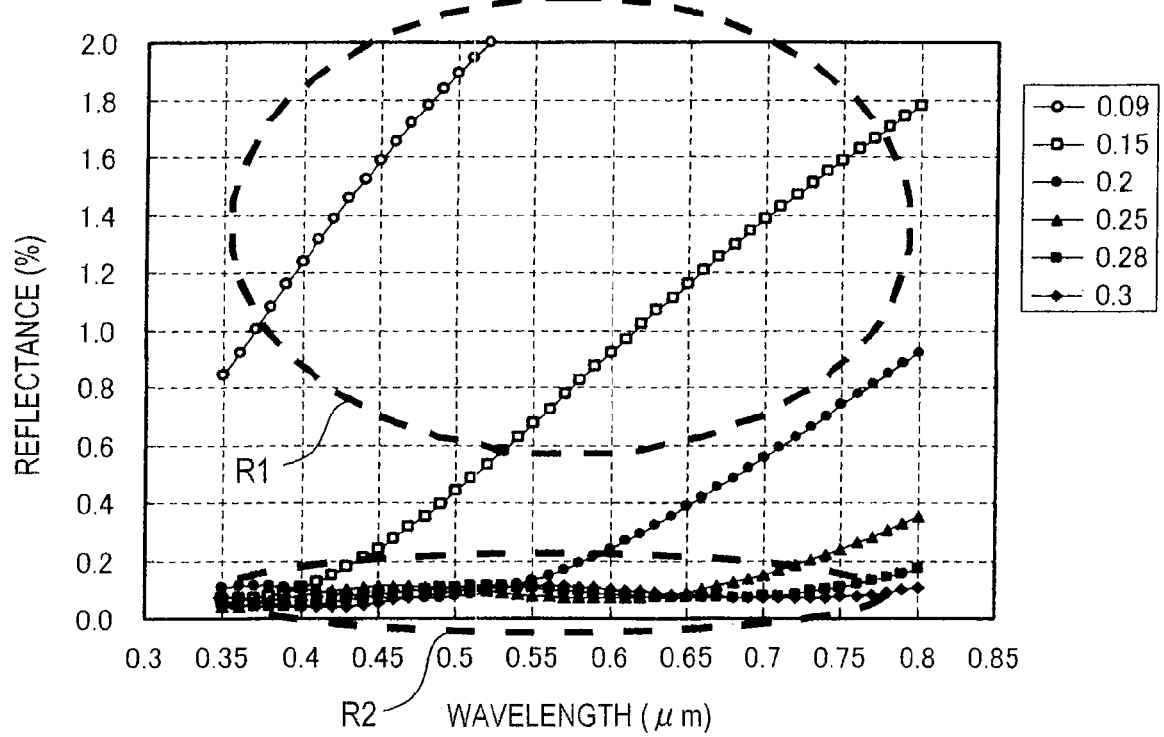
FIG. 34 is a graph illustrating a simulation result of Test Example 6.

It can be seen from FIGS. 33 and 34 that the reflectance tends to decrease in spite of a great track pitch Tp when the fine protruding portions are provided around the structures but the reflectance tends to deteriorate to the contrary when the structures are small (particularly, see area R1 and area R2 in FIG. 34).

It can be seen from FIG. 35 that the suppression of diffraction at a wavelength of 400 nm tends to deteriorate when the track pitch Tp is 0.3 µm.

Test Example 7

Figure 36A:
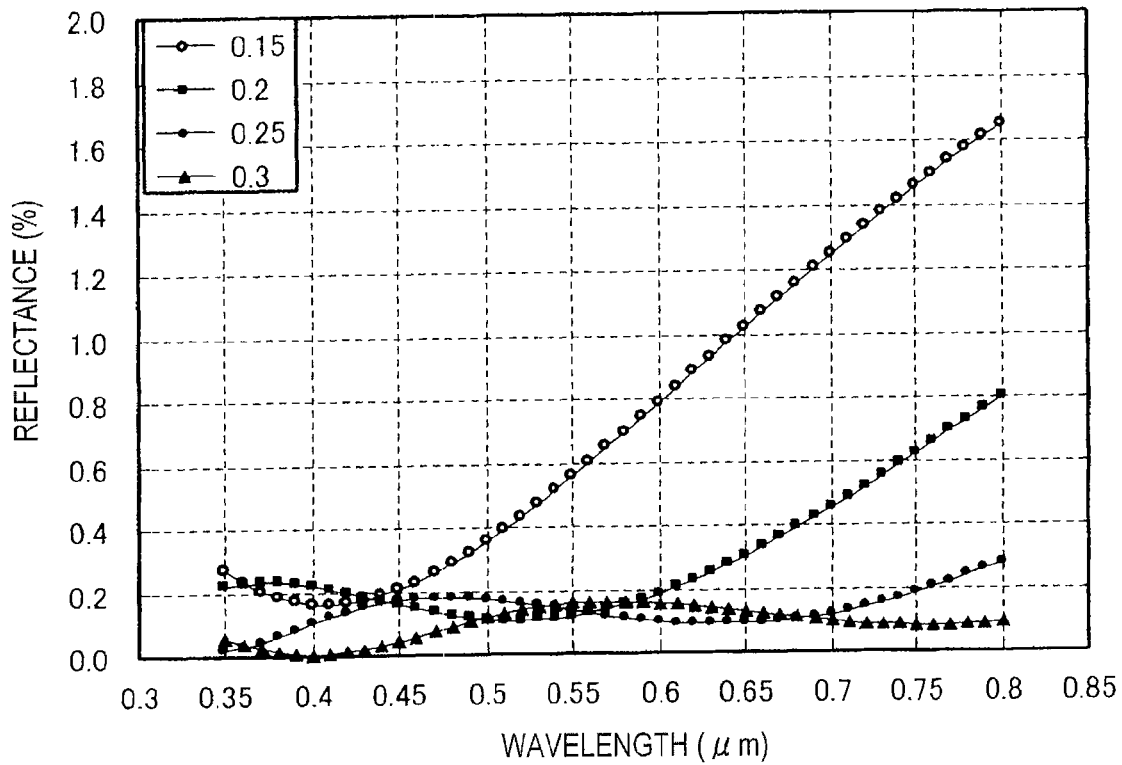
FIG. 36A is a graph illustrating a simulation result of Test Example 7 and FIG. 36B is a graph illustrating a simulation result of Test Example 8.

In a state where the track pitch is set to 0.25 µm and the height and the aspect ratio of the structures are changed, the RCWA simulation was carried out. The result is shown in FIG. 36A.

The simulation condition is as follows:
Shape of structure: hanging bell type;
Polarization: non-polarized;
Arranged Lattice: hexagonal lattice;
Refractive Index: 1.48;
Track pitch Tp: 0.25 μm;
Height of Structure: 0.15 nm, 0.2 nm, 0.25 nm, and 0.3 nm;
Aspect Ratio: 0.6, 0.8, 1.0, and 1.2; and
Diameter of Bottom surface of Structure: 99% of track pitch Tp.

Test Example 8

Figure 36B:
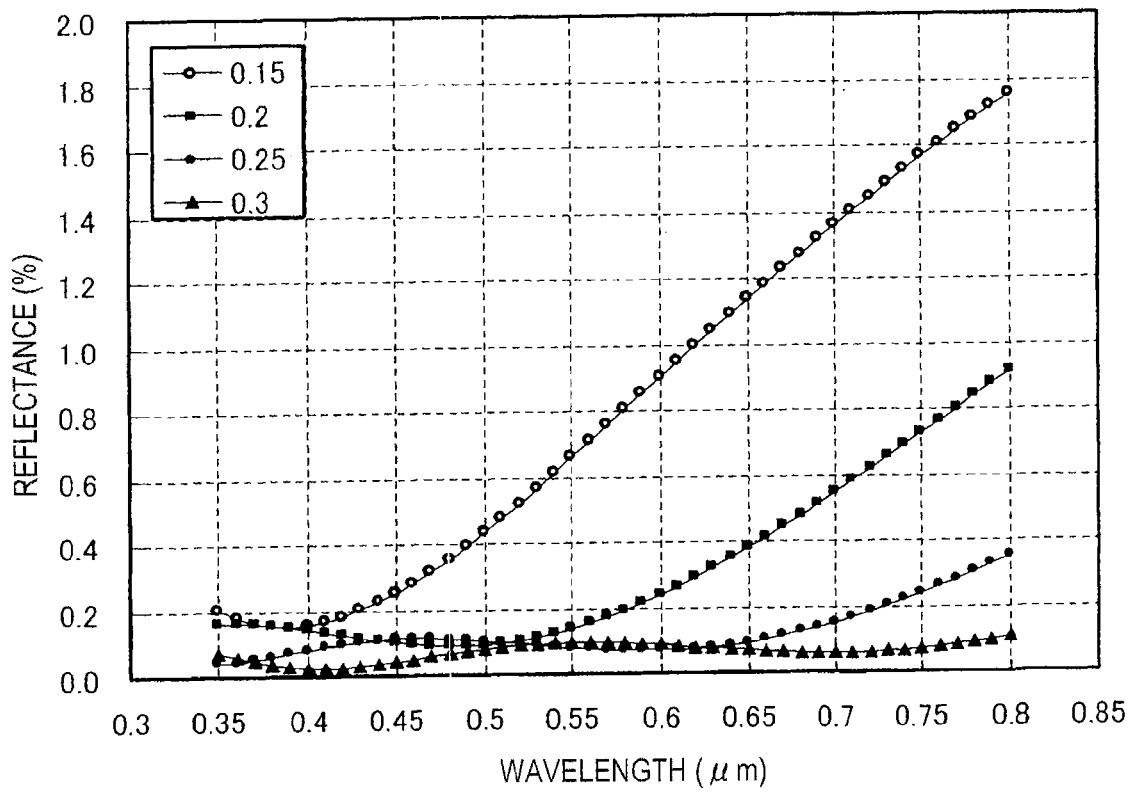

Similarly to Test Example 7 except that fine protruding portions are provided around the structures, the RCWA simulation was carried out. The result is shown in FIG. 36B.

Test Example 9

Figure 37A:
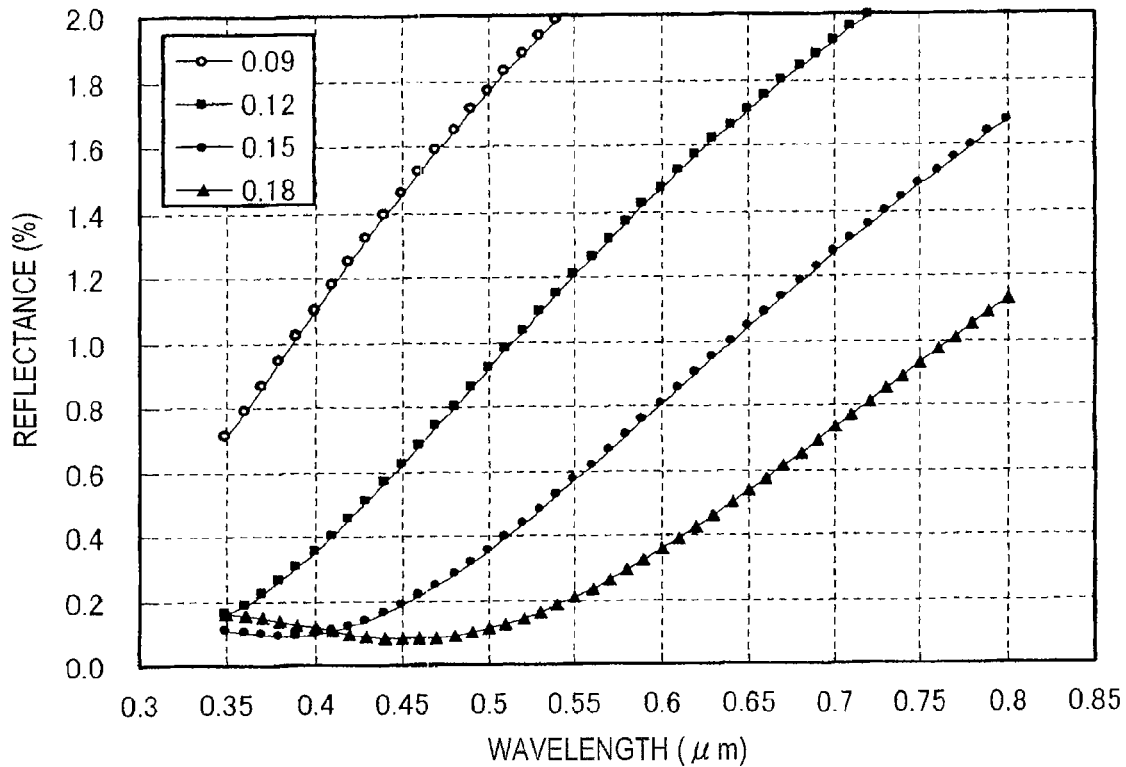
FIG. 37A is a graph illustrating a simulation result of Test Example 9 and FIG. 37B is a graph illustrating a simulation result of Test Example 10.

Similarly to Test Example 7 except that the track pitch is set to 0.15 μm, the height of the structures is changed to 0.09 μm, 0.12 μm, 0.15 μm, and 0.18 μm, and the aspect ratio is changed to 0.6, 0.8, 1.0, and 1.2, the RCWA simulation was carried out. The result is shown in FIG. 37A.

Test Example 10

Figure 37B:
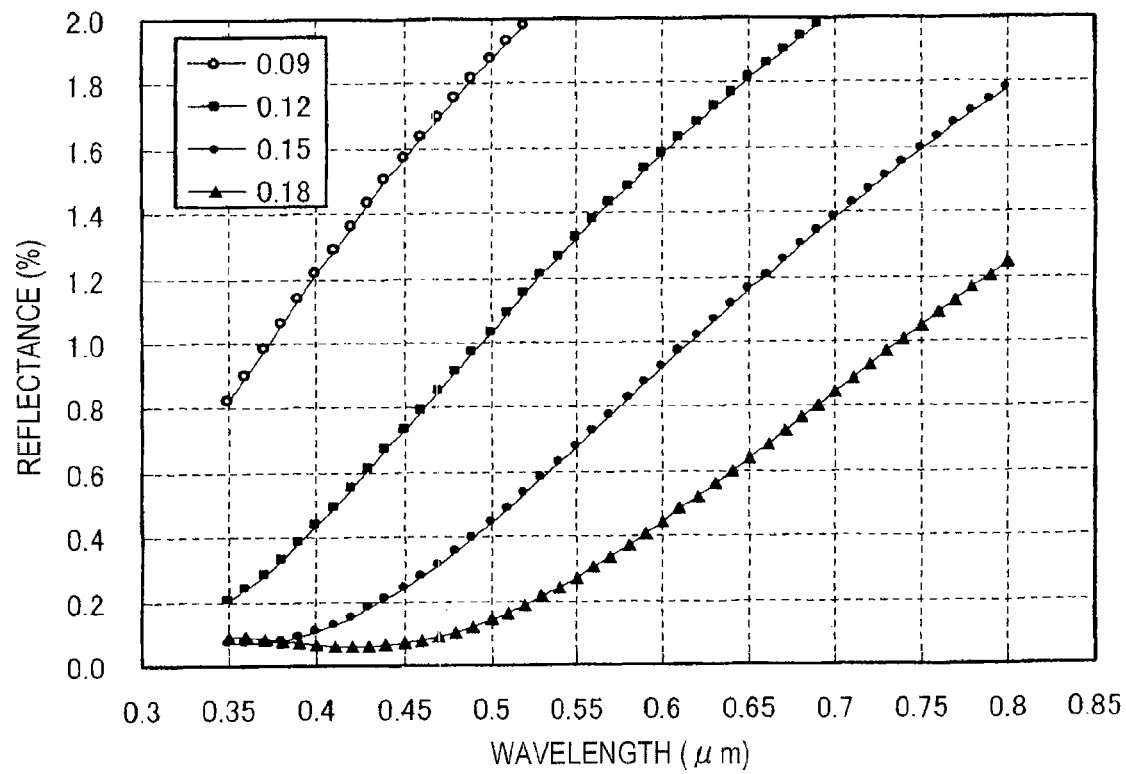

Similarly to Test Example 9 except that fine protruding portions are provided around the structures, the RCWA simulation was carried out. The result is shown in FIG. 37B.

Test Example 11

Figure 38A:
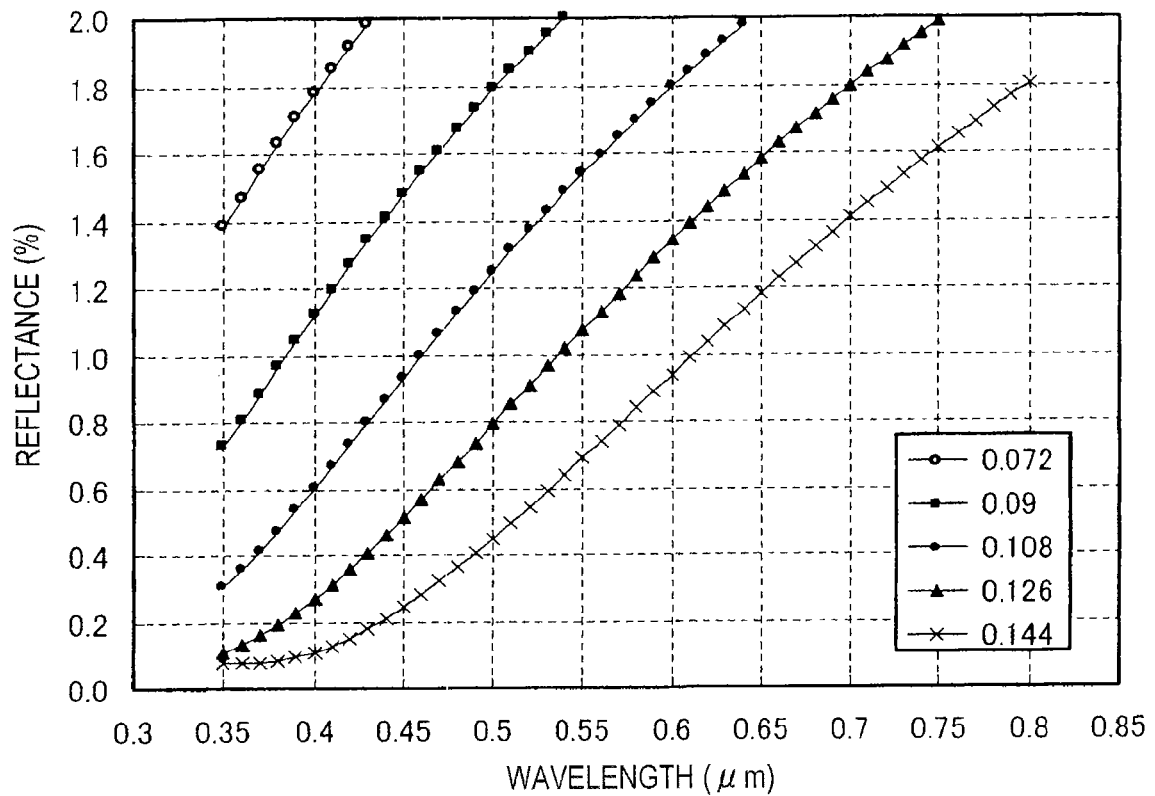
FIG. 38A is a graph illustrating a simulation result of Test Example 11 and FIG. 38B is a graph illustrating a simulation result of Test Example 12.

Similarly to Test Example 7 except that the track pitch is set to 0.09 μm, the height of the structures is changed to 0.072 μm, 0.09 μm, 0.108 μm, 0.126 μm, and 0.144 μm, and the aspect ratio is changed to 0.8, 1.0, 1.2, 1.4, and 1.6, the RCWA simulation was carried out. The result is shown in FIG. 38A.

Test Example 12

Figure 38B:
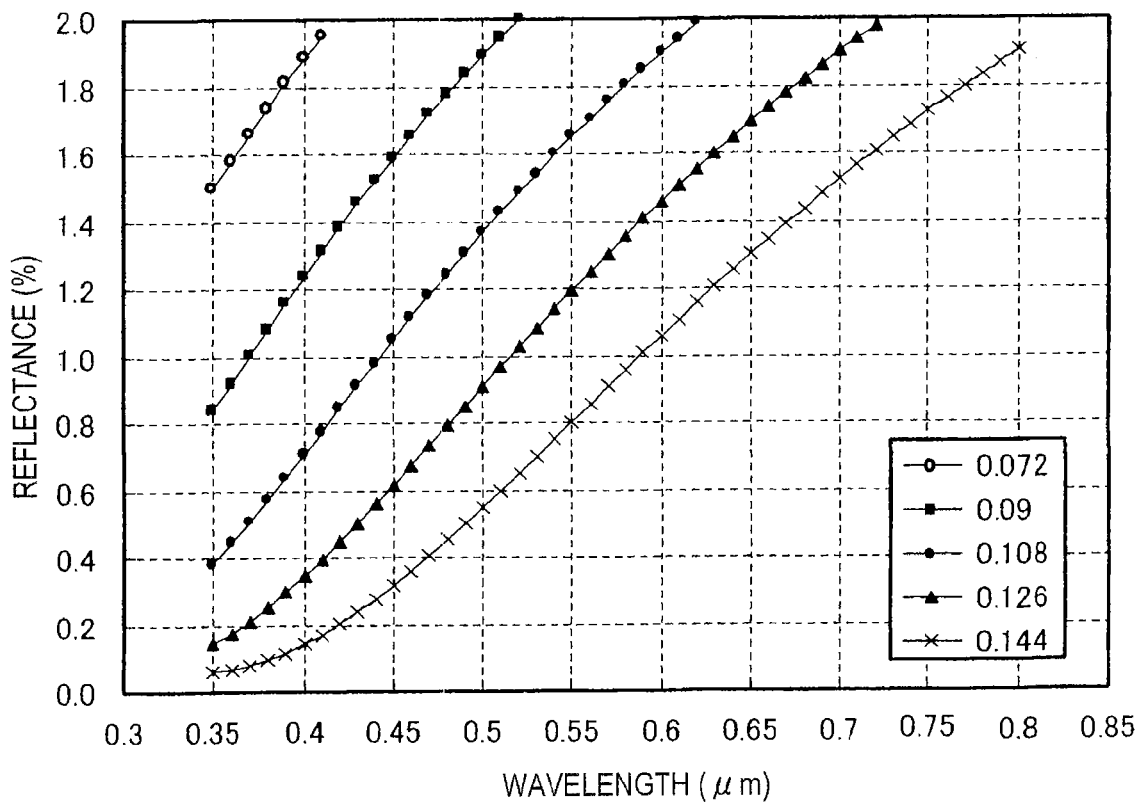

Similarly to Test Example 11 except that fine protruding portions are provided around the structures, the RCWA simulation was carried out. The result is shown in FIG. 38B.

It can be considered from FIGS. 36 to 38 that the track pitch TP is limited to 0.15 μm and the aspect ratio is limited to 1.0 so as to suppress the reflectance R to 1% or less. It can be also seen that the suppressing effect of the reflectance tends to decrease when the fine protruding portions are provided but the track pitch Tp is small.

The relation of the ratio $((2r/P1) \times 100)$ and the antireflection characteristic was studied by the RCWA (Rigorous Coupled Wave Analysis) simulation.

Test Example 13

Figure 39A:
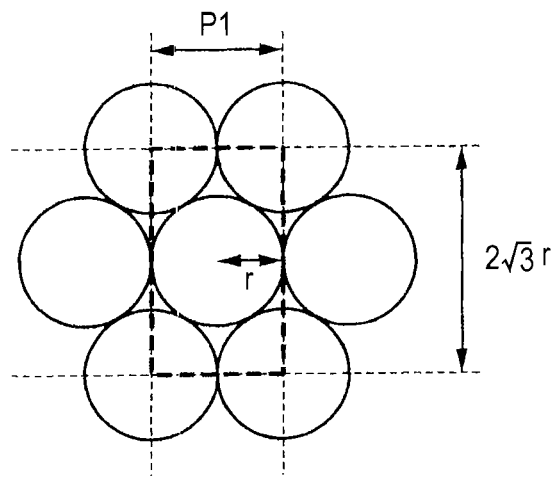
FIG. 39A is a diagram illustrating a filling rate when the structures are arranged in a hexagonal lattice shape and FIG. 39B is a diagram illustrating a filling rate when the structures are arranged in a tetragonal lattice shape.

FIG. 39A is a diagram illustrating the filling rate when the structures are arranged in a hexagonal lattice shape. As shown in FIG. 39A, the filling rate when the ratio $((2r/P1) \times 100)$ (where P1 represents the arrangement pitch of the structures in the same track and r represents the radius of the bottom surface of the structure) is changed was calculated using Expression 2.

Filling rate=$(S(hex.)/S(unit)) \times 100$    Expression 2

Here, the area of the unit lattice is $S(unit)=2r \times (2\sqrt{3})r$ and the area of the bottom surface of the structure existing in the unit lattice is $S(hex.)=2 \times \pi r^2$ (which is calculated from the drawn figure when $2r > P1$).

For example, when the arrangement pitch is $P1=2$ and the radius of the bottom surface of the structures is $r=1$, $S(unit)$, $S(hex.)$, the ratio $((2r/P1) \times 100)$, and the filling rate are as follows:

$S(unit)=6.9282$;

$S(hex.)=6.28319$;

$(2r/P1) \times 100=100.0\%$; and

Filling rate=$(S(hex.)/S(unit)) \times 100=90.7\%$.

The relation of the filling rate and the ratio $((2r/P1) \times 100)$ calculated by Expression 2 is shown in Table 5.

TABLE 5

| (2r/P1) × 100 | Filling Rate |
| --- | --- |
| 115.4% | 100.0% |
| 110.0% | 95.6% |
| 105.0% | 92.5% |
| 100.0% | 90.7% |
| 99.0% | 88.9% |
| 95.0% | 81.8% |
| 90.0% | 73.5% |
| 85.0% | 65.5% |
| 80.0% | 58.0% |
| 75.0% | 51.0% |

Test Example 14

Figure 39B:
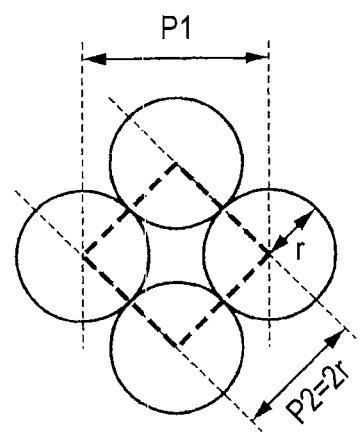

FIG. 39B is a diagram illustrating the filling rate when the structures are arranged in a tetragonal lattice shape. As shown in FIG. 39B, the filling rate when the ratio $((2r/P1) \times 100)$ and the ratio $((2r/P2) \times 100)$ (where P1 represents the arrangement pitch of the structures in the same track, P2 represents the arrangement pitch of the structures in the direction oblique by 45 degree with respect to the tracks, and r represents the radius of the bottom surface of the structure) are changed was calculated using Expression 3.

Filling rate=$(S(tetra)/S(unit)) \times 100$    Expression 3

Here, the area of the unit lattice is $S(unit)=2r \times 2r$ and the area of the bottom surface of the structure existing in the unit lattice is $S(tetra)=\pi r^2$ (which is calculated from the drawn figure when $2r > P1$).

For example, when the arrangement pitch is $P2=2$ and the radius of the bottom surface of the structures is $r=1$, $S(unit)$, $S(tetra)$, the ratio $((2r/P1) \times 100)$, the ratio $((2r/P2) \times 100)$, and the filling rate are as follows:

$S(unit)=4$;

$S(tetra)=3.14159$;

$(2r/P1) \times 100=141.4\%$;

$(2r/P2) \times 100=100.0\%$; and

Filling rate=$(S(tetra)/S(unit)) \times 100=78.5\%$.

The relation of the filling rate, the ratio $((2r/P1) \times 100)$, and the ratio $((2r/P2) \times 100)$ calculated by Expression 3 is shown in Table 6.

The arrangement pitches P1 and P2 of the tetragonal lattice have the relation of $P1=\sqrt{2} \times P2$.

TABLE 6

| (2r/P1) × 100 | (2r/P2) × 100 | Filling Rate |
|---|---|---|
| 200.0% | 141.4% | 100.0% |
| 169.7% | 120.0% | 95.1% |
| 162.6% | 115.0% | 92.4% |
| 155.6% | 110.0% | 88.9% |
| 148.5% | 105.0% | 84.4% |
| 141.4% | 100.0% | 78.5% |
| 140.0% | 99.0% | 77.0% |
| 134.4% | 95.0% | 70.9% |
| 127.3% | 90.0% | 63.6% |
| 120.2% | 85.0% | 56.7% |
| 113.1% | 80.0% | 50.3% |
| 106.1% | 75.0% | 44.2% |

Test Example 15

In a state where the ratio $(2r/P1) \times 100$ of the diameter $2r$ of the bottom surface of the structures to the track pitch $P1$ is changed to 80%, 85%, 90%, 95%, and 99%, the reflectance was calculated by simulation under the following conditions. The result is shown in FIG. 40.

Shape of structure: hanging bell type;
Polarization: non-polarized;
Refractive Index: 1.48;
Arrangement pitch $P1$: 320 nm;
Height of Structure: 415 nm;
Aspect Ratio: 1.30;
Arrangement of Structures: hexagonal lattice.

Figure 40:
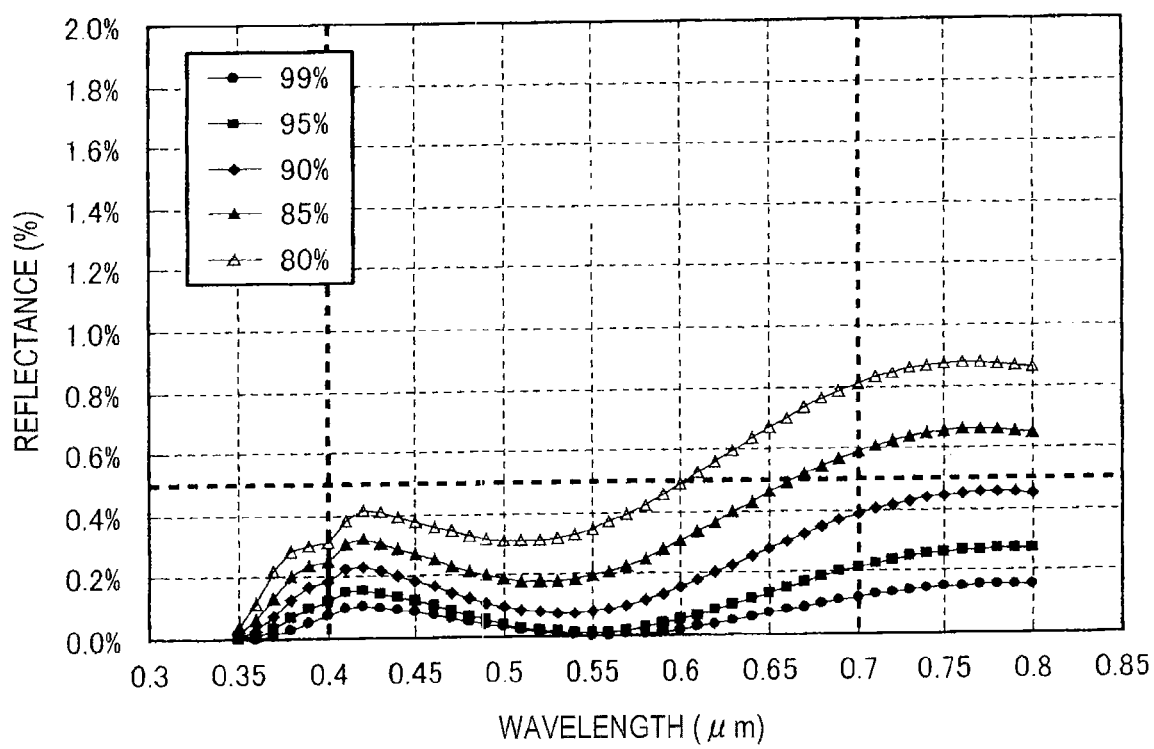
FIG. 40 is a graph illustrating a simulation result of Test Example 15.

It can be seen from FIG. 40 that the average reflectance R satisfies R<0.5%, which is satisfactory as the antireflection effect, in the wavelength range (0.4 μm to 0.7 μm) of visible light when the ratio $(2r/P1) \times 100$ is 85% or more. At this time, the filling rate of the bottom surfaces is 65% or more. When the ratio $(2r/P1) \times 100$ is 90% or more, the average reflectance R satisfies R<0.3%, which provides a higher-performance antireflection effect, in the wavelength range of visible light. At this time, the filling rate of the bottom surfaces is 73% or more. As the filling rate becomes closer to the upper limit of 100%, the performance becomes higher. When the structures overlap with each other, the height of the structures is considered as the height from the lowest position. It was confirmed that the tendency of the filling rate and the reflectance is the same in the tetragonal lattices.

Although the examples have been described as an antireflection substrate, the examples can be modified in various forms.

The configurations, methods, shapes, materials, and numerical values described in the embodiments and the examples are only examples and different configurations, methods, shapes, materials, and numerical values may be employed as needed.

Although the embodiment is applied to the liquid crystal display in the above-mentioned embodiments, the embodiment may be applied to various display apparatuses other than the liquid crystal display. The invention can be applied to various display apparatuses such as a CRT (Cathode Ray Tube) display, a plasma display panel (PDP), an electroluminescence (EL) display, and a surface-condition electron emitter display (SED).

Although an example where the embodiment is applied to the polarizer to form an antireflection function polarizer has been described in the above-mentioned embodiments, the embodiment is not limited to the example. The embodiment may be applied to a lens, a light guide plate, a window material, a display device, and a camera lens tube to form antireflection function optical components, in addition to the polarizer. The invention may be applied to devices other than the optical components and the invention may be applied to, for example, a solar cell.

By properly changing the pitches of the structures in the above-mentioned embodiment to generate diffracted light in the direction oblique about the front surface, a peep-preventing function may be given to an optical device.

In the above-mentioned embodiments, a low refractive layer may be further formed on the surface of the base member in which the structures are formed. It is preferable that the low refractive layer contains a material having a refractive index lower than that of the materials of the base member and the structures as a main component. Examples of the low refractive index can include an organic material such as fluorine resin and an inorganic low refractive material such as LiF and MgF2.

Although the optical device is manufactured using photosensitive resin in the above-mentioned embodiments, the method of manufacturing the optical device is not limited to the embodiments. For example, the optical device may be manufactured by thermal transfer or injection molding.

In the above-mentioned embodiment, concave or convex structures are formed on the outer peripheral surface of the columnar or cylindrical master. However, when the master is cylindrical, concave or convex structures may be formed on the inner peripheral surface of the master.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An antireflection optical device comprising:
a base member; and
a plurality of convex or concave structures arranged on the surface of the base member with a fine pitch equal to or smaller than the wavelength of visible light,
wherein the structures are arranged on the surface of the base member to form a plurality of straight lines of tracks and to form one of a hexagonal lattice pattern, a quasi-hexagonal lattice pattern, a tetragonal lattice pattern, and a quasi-tetragonal lattice pattern, and
wherein each structure has an elliptical cone shape or a truncated elliptical cone shape in plan view of which a long-axis direction is parallel to a track extending direction.

2. The antireflection optical device according to claim 1, wherein the structures are arranged to form quasi-hexagonal lattice pattern, and
wherein the height or depth of the structures in the track extending direction is smaller than the height or depth of the structures in the track arranging direction.

3. The antireflection optical device according to claim 1, wherein the structures are arranged to form one of a tetragonal lattice pattern and a quasi-tetragonal lattice pattern, and
wherein the height or depth of the structures in an arrangement direction oblique about the track extending direction is smaller than the height or depth of the structures in the track extending direction.

4. The antireflection optical device according to claim 1, wherein an arrangement pitch $P1$ of the structures in the same track is greater than an arrangement pitch $P2$ of the structures in two adjacent tracks.

5. The antireflection optical device according to claim 1, wherein the structures form one of a hexagonal lattice pattern and a quasi-hexagonal lattice pattern on the surface of the base member, and wherein a ratio P1/P2 satisfies one relation of $1.00 \leq P1/P2 \leq 1.1$ and $1.00 < P1/P2 \leq 1.1$, where P1 represents an arrangement pitch of the structures in the same track and P2 represents an arrangement pitch of the structures in two adjacent tracks.

6. The antireflection optical device according to claim 1, wherein the structures form one of a tetragonal lattice pattern and a quasi-tetragonal lattice pattern on the surface of the base member, and wherein a ratio P1/P2 satisfies a relation of $1.4 < P1/P2 \leq 1.5$, where P1 represents an arrangement pitch of the structures in the same track and P2 represents an arrangement pitch of the structures in two adjacent tracks.

\* \* \* \* \*